US012099313B2

(12) United States Patent
Eguchi et al.

(10) Patent No.: US 12,099,313 B2
(45) Date of Patent: Sep. 24, 2024

(54) IMAGE FORMING APPARATUS

(71) Applicant: CANON KABUSHIKI KAISHA, Tokyo (JP)

(72) Inventors: Hiroki Eguchi, Kanagawa (JP); Masatake Usui, Shizuoka (JP); Masaki Hirose, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/220,454

(22) Filed: Jul. 11, 2023

(65) Prior Publication Data

US 2024/0019794 A1 Jan. 18, 2024

(30) Foreign Application Priority Data

Jul. 12, 2022 (JP) ................................ 2022-112088

(51) Int. Cl.
*G03G 15/043* (2006.01)

(52) U.S. Cl.
CPC .................................. *G03G 15/043* (2013.01)

(58) Field of Classification Search
CPC ........... G03G 15/0266; G03G 15/1675; G03G 21/0064; G03G 15/043; G03G 15/065; G03G 21/08
See application file for complete search history.

(56) References Cited

U.S. PATENT DOCUMENTS 10,921,741 B2 2/2021 Shindo et al.
2013/0142528 A1* 6/2013 Watanabe ............ G03G 15/045 399/46
2019/0339639 A1* 11/2019 Shindo ............... G03G 15/1665
2020/0174393 A1* 6/2020 Nishiyama ............ G06F 3/1274

FOREIGN PATENT DOCUMENTS

JP 2003-302808 A 10/2003
JP 2007-232856 A 9/2007
JP 2011-203335 A 10/2011
JP 2019-194650 A 11/2019

* cited by examiner

*Primary Examiner* — Jessica L Eley
(74) *Attorney, Agent, or Firm* — Venable LLP

(57) ABSTRACT

An image forming apparatus includes a photosensitive drum, a charging member, an exposure unit, a developing member, and a transfer member. In a rotational axis direction of the charging member, a width of a transfer portion of the transfer member is shorter than that of a charging portion of the charging member, and an end of the surface of the photosensitive drum in the axis direction includes a non-transfer area in contact with the charging member and not in contact with the transfer member. The exposure unit exposes the non-transfer area during rotation of the photosensitive drum, and forms a surface potential on the surface downstream of an exposing portion and upstream of the transfer portion with respect to a rotational direction. A controller controls such that an absolute value of the surface potential of the non-transfer area is lower than that of the transfer outside paper passing area.

24 Claims, 12 Drawing Sheets

IMAGE FORMING APPARATUS

FIELD OF THE INVENTION AND RELATED ART

The present invention relates to an image forming apparatus such as a laser beam printer, a copy machine, and a facsimile machine using an electrophotographic method.

Conventionally, in the image forming apparatus using the electrophotographic method, a surface of a photosensitive member is charged substantially uniformly by a charging means to form a dark portion potential on the surface of the photosensitive member. The surface of the photosensitive member after the charging process is then exposed by an exposure means to form a light portion potential on the surface of the photosensitive member, and an electrostatic latent image is formed on the photosensitive member by a contrast between the above dark portion potential and the above light portion potential. Then, toner is supplied to the electrostatic latent image formed on the photosensitive member by a developing means to form a toner image on the photosensitive member. A developing device provided with a developing roller, which is a roller-shaped developing member, is often used as the developing means.

A toner image formed on the photosensitive member is transferred onto a recording material by a transfer means. A transfer roller, which is a roller-shaped transfer member, is often used as the transfer means. The transfer roller abuts the photosensitive member to form a transfer portion (transfer nip portion). The transfer roller nips and conveys the recording material between the photosensitive member, and transfers the toner on the photosensitive member onto the recording material. During the transfer, a transfer voltage having a reverse polarity to a normal charging polarity of the toner (normal polarity) is applied to the transfer roller, and the toner image on the photosensitive member is electrostatically transferred onto the recording material. Incidentally, although the recording material is sometimes referred to as a "paper", the recording material is not limited to the paper, but may also be materials mainly made of synthetic resin such as an OHP sheet and a synthetic paper, etc. In addition, for the sake of convenience, a high/low (large/small) and an up/down of electric potential and voltage shall refer to the high/low (large/small) and the up/down when compared in terms of absolute values of electric potential and voltage.

Here, there is a method for charging the photosensitive member by using an electroconductive charging member that contacts the photosensitive member as the charging means, and applying voltage to the charging member to perform a charging. A charging roller, which is a roller-shaped charging member, is often used as the charging member. In addition, in such charging methods, there are two methods: an AC/DC charging method, in which an oscillating voltage superimposed with a direct current voltage (DC voltage) and an alternating current voltage (AC voltage) is applied to the charging member, and a DC charging method, in which only a direct current voltage (DC voltage) is applied to the charging member. An advantage of the DC charging method is that it does not require an AC power supply, thus making it possible to reduce a size and cost of an apparatus.

In addition, a pre-exposure means that exposes the surface of the photosensitive member is sometimes provided at a downstream side of a transfer position by the transfer means and at an upstream side of a charging position by the charging means with respect to a rotational direction of the photosensitive member to remove residual electric charge on the surface of the photosensitive member after the transfer process. An LED chip array, a fuse lamp, a halogen lamp, a fluorescent lamp, etc., are used as the pre-exposure means (charge eliminating means). In contrast, there is a pre-exposureless method that omits the pre-exposure means and that enables downsizing and reducing the cost of an apparatus.

In Japanese Patent Application Laid-open No. 2003-302808, an image forming apparatus with a simple configuration employing the DC charging method and the pre-exposureless method described above is proposed.

Incidentally, in Japanese Patent Application Laid-open No. 2019-194650, a configuration to suppress an adhesion of the toner to the surface of the photosensitive member by lowering a surface potential of a non-paper passing area on the photosensitive member by adjusting an exposure amount by the exposure device to the non-paper passing area on the photosensitive member is proposed.

However, in the conventional image forming apparatus, in a case where a contact area of the photosensitive member contacting with the transfer roller is shorter than a contact area of the surface of the photosensitive member contacting with the charging roller with respect to a direction that is substantially perpendicular to a movement direction of the surface of the photosensitive member (conveyance direction of the recording material), it is found that following problems exist. Incidentally, the direction that is substantially perpendicular to the movement direction of the photosensitive member (conveyance direction of the recording material) (i.e., a direction that is substantially parallel to a rotational axis direction of the charging roller) is sometimes referred to as a "longitudinal direction". In addition, a length of the contact area of the surface of the photosensitive member contacting with the charging roller may be described simply as a length of the charging roller, and a length of the contact area of the surface of the photosensitive member contacting with the transfer roller may be described simply as a length of the transfer roller.

In the case where the length of the transfer roller is shorter than the length of the charging roller with respect to the longitudinal direction, an area where the charging roller contacts the photosensitive member and where the transfer roller does not contact the photosensitive member appears at an end portion with respect to the longitudinal direction. Here, an area of the surface of the photosensitive member where the transfer roller contacts is referred to as a "transfer area", and an area of the surface of the photosensitive member where the charging roller contacts but the transfer roller does not contact is referred to as a "non-transfer area". Considering the surface potential of the photosensitive member after the transfer, in the transfer area, the surface potential of the photosensitive member lowers since the transfer voltage is applied when the toner image is transferred from the photosensitive member to the recording material. On the other hand, in the non-transfer area, the surface potential of the photosensitive member remains high since no transfer voltage is applied thereto. As a result, the surface potential of the photosensitive member after the transfer will have a potential difference between the transfer area and the non-transfer area. Although the potential difference becomes smaller during a subsequent charging process, the potential difference gradually rises as the photosensitive member repeatedly passes through the transfer portion. For example, in a configuration where a reverse developing method using a toner having a negative chargeability is employed, the above non-transfer area is negatively charged by the charging roller but not positively charged by the transfer roller. Therefore, when the charging is repeated in a continuous image formation, etc., in the above non-transfer area, the surface potential of the photosensitive member may rise to an excessive negative potential since a charge eliminating effect is not obtained by a positive charging by the transfer roller.

The phenomenon, in which the surface potential of the non-transfer area in the end portion of the photosensitive member with respect to the longitudinal direction rises to an excessive potential as described above, tends to be more significant when the image forming apparatus employs the DC charging method, in which an equalization effect of the potential by the alternating current voltage is not obtained, and furthermore when the pre-exposureless method is employed.

And when the surface potential of the non-transfer area in the end portion of the photosensitive member with respect to the longitudinal direction rises to the excessive potential as described above, following problems may occur, for example.

When the surface potential of the non-transfer area in the end portion of the photosensitive member with respect to the longitudinal direction rises to the excessive potential, it may cause a discharge between the photosensitive member and a core metal portion of the transfer roller in the non-transfer area, resulting in damage such as leakage marks to the surface of the photosensitive member due to a breakdown. Then, when a charge voltage is applied to the charging member while the damage is on the photosensitive member, current may concentrate in the damaged portion, causing the applied voltage to the charging member to drop. As a result, the photosensitive member, including other areas, cannot be brought to a desired surface potential, and a streak image in the longitudinal direction may occur due to the charging defect.

In addition, with respect to the longitudinal direction, there is a configuration where a toner coated area on the developing roller (developing area) is longer than the contact area of the surface of the photosensitive member contacting with the transfer roller. In this configuration, the developing area is opposing both the transfer area and the non-transfer area of the photosensitive member. If the surface potential in the non-transfer area of the photosensitive member rises to the excessive potential as described above, a “reverse fogging” may occur, in which a “reverse toner” charged with the reverse polarity to the normal charging polarity adheres to the surface of the photosensitive member. In a case where the toner adhering to the non-transfer area on the surface of the photosensitive member increases due to this “reverse fogging”, a cleaning defect may occur. Then, due to the cleaning defect, an “end portion stain”, in which the end portion of the recording material with respect to the direction substantially perpendicular to the conveyance direction of the recording material is stained by the toner, may occur.

Incidentally, in a method described in the Japanese Patent Application Laid-Open No. 2019-194650, an exposure amount to the photosensitive member in an area with which the transfer roller contacts is adjusted. However, the method cannot handle the above problem of the rise of the surface potential of the photosensitive member outside the area with which the transfer roller contacts.

SUMMARY OF THE INVENTION

An object of the present invention, then, is to suppress the excessive rise of the surface potential of the end portion of the photosensitive member with respect to the longitudinal direction in a configuration where the contact area of the surface of the photosensitive member contacting with the transfer member is shorter than the contact area of the surface of the photosensitive member contacting with the charging member with respect to the longitudinal direction.

The above object is achieved with an image forming apparatus according to the present invention. In summary, the present invention is regarding an image forming apparatus comprising: a rotatable photosensitive member; a rotatable charging member configured to form a charging portion in contact with the photosensitive member and to charge a surface of the photosensitive member at the charging portion; an exposure unit configured to expose the surface of the photosensitive member charged by the charging member and to form an electrostatic image on the surface of the photosensitive member; a developing member configured to supply toner to the electrostatic image formed on the surface of the photosensitive member and to form a toner image; a transfer member configured to form a transfer portion in contact with the surface of the photosensitive member and to transfer the toner image to a recording material from the surface of the photosensitive member at the transfer portion by application of a voltage; and a control portion configured to control the exposure unit, wherein in a rotational axis direction of the charging member, a width of the transfer portion is shorter than a width of the charging portion, and an end portion of the surface of the photosensitive member in the rotational axis direction includes a non-transfer area in contact with the charging member and in no contact with the transfer member, wherein in the rotational axis direction, an area in contact with the recording material at the transfer portion of the surface of the photosensitive member is defined as a paper passing area and an area outside of the paper passing area and inside of the transfer portion is defined as a transfer outside paper passing area, wherein the control portion is capable of performing an exposing operation such that the exposure unit exposes at least the non-transfer area of the photosensitive member during rotation of the photosensitive member, controls the exposure unit to form a surface potential on the surface of the photosensitive member downstream of an exposing portion where the surface of the photosensitive member is exposed by the exposing operation and upstream of the transfer portion in a rotational direction of the photosensitive member, and controls the exposure unit such that an absolute value of the surface potential formed on the non-transfer area is smaller than an absolute value of the surface potential formed on the transfer outside paper passing area downstream of the exposing portion and upstream of the transfer portion in the rotational direction of the photosensitive member.

According to another aspect of the present invention, an image forming apparatus comprises a rotatable photosensitive member, a rotatable charging member configured to form a charging portion in contact with the photosensitive member and to charge a surface of the photosensitive member at the charging portion; an exposure unit configured to expose the surface of the photosensitive member charged by the charging member and to form an electrostatic image on the surface of the photosensitive member; a developing member configured to supply toner to the electrostatic image formed on the surface of the photosensitive member and to form a toner image; a transfer member configured to form a transfer portion in contact with the surface of the photosensitive member and to transfer the toner image to a recording material from the surface of the photosensitive member at the transfer portion by application of a voltage; and a control portion configured to control the exposure unit, wherein in a rotational axis direction of the charging member, a width of the transfer portion is shorter than a width of the charging portion, and an end portion of the surface of the photosensitive member in the rotational axis direction includes a non-transfer area in contact with the charging member and in no contact with the transfer member, wherein in the rotational axis direction, an area in contact with the recording material at the transfer portion of the surface of the photosensitive member is defined as a paper passing area and an area outside of the paper passing area and inside of the transfer portion is defined as a transfer outside paper passing area, wherein the control portion is capable of performing an exposing operation such that the exposure unit exposes at least the non-transfer area of the photosensitive member during rotation of the photosensitive member, and controls the exposure unit such that an exposure amount to the non-transfer area is larger than an exposure amount to the transfer outside paper passing area in the exposing operation.

According to another aspect of the present invention, an image forming apparatus comprises a rotatable photosensitive member; a rotatable charging member configured to form a charging portion in contact with the photosensitive member and to charge a surface of the photosensitive member at the charging portion; an exposure unit configured to expose the surface of the photosensitive member charged by the charging member and to form an electrostatic image on the surface of the photosensitive member; a developing member configured to supply toner to the electrostatic image formed on the surface of the photosensitive member and to form a toner image; a transfer member configured to form a transfer portion in contact with the surface of the photosensitive member and to transfer the toner image to a recording material from the surface of the photosensitive member at the transfer portion by application of a voltage; and a control portion configured to control the exposure unit, wherein in a rotational axis direction of the charging member, a width of the transfer portion is shorter than a width of the charging portion, an end portion of the surface of the photosensitive member in the rotational axis direction includes a non-transfer area in contact with the charging member and in no contact with the transfer member, and at least a part of a toner coated area of the developing member overlaps with the non-transfer area in the rotational axis direction, wherein in the rotational axis direction, an area in contact with the recording material at the transfer portion of the surface of the photosensitive member is defined as a paper passing area and an area outside of the paper passing area and inside of the transfer portion is defined as a transfer outside paper passing area, wherein the control portion controls to perform an exposing operation such that the exposure unit exposes at least the non-transfer area of the photosensitive member or at least the non-transfer area of the photosensitive member and the transfer outside paper passing area during rotation of the photosensitive member.

Further features of the present invention will become apparent from the following description of exemplary embodiments with reference to the attached drawings.

DESCRIPTION OF THE EMBODIMENTS

Hereinafter, an image forming apparatus according to the present invention will be described in more detail with reference to the drawings.

(1) Image Forming Apparatus

Figure 1:
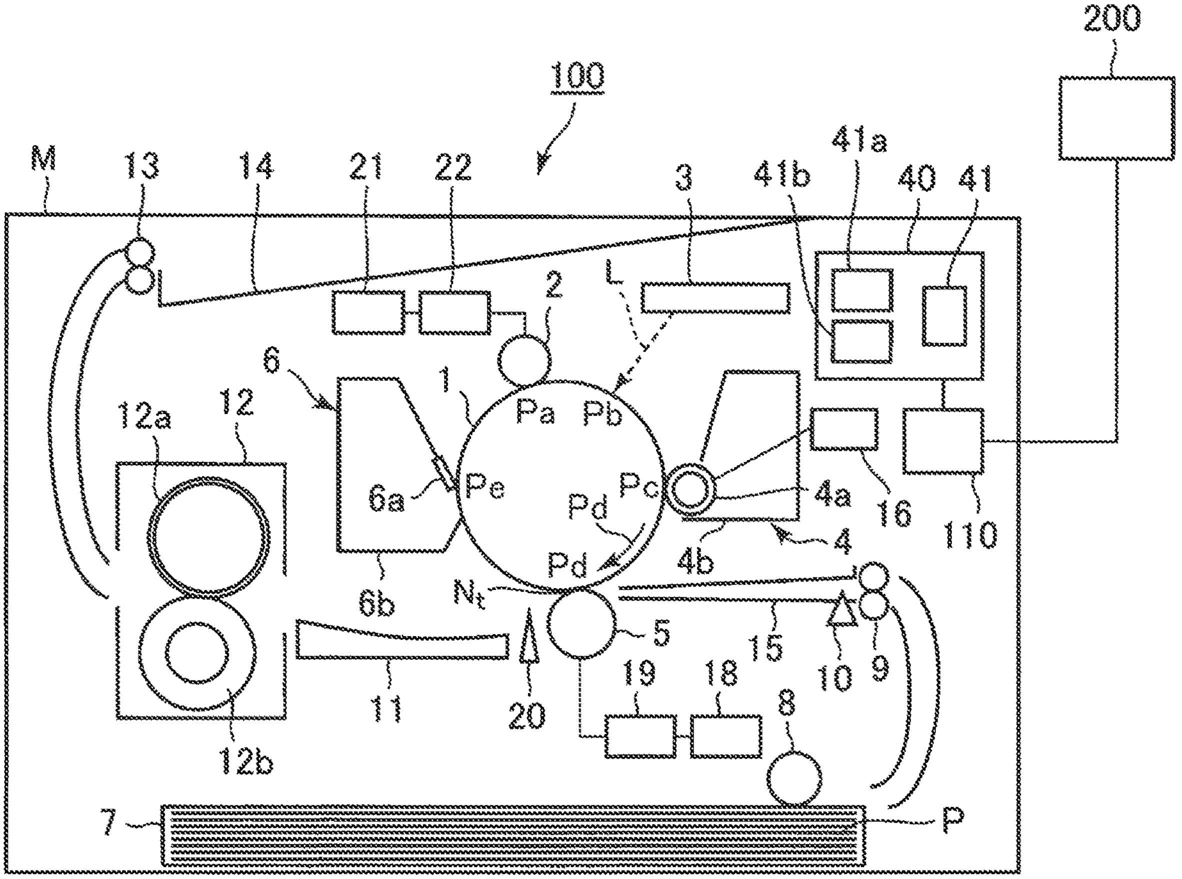
FIG. 1 is a schematic cross-sectional view of an image forming apparatus.

First, a configuration of an image forming apparatus 100 of an Embodiment 1 will be described. FIG. 1 is a schematic cross-sectional view of the image forming apparatus 100 of the present Embodiment. The image forming apparatus 100 of the present Embodiment is an electrophotographic laser printer, which can form an image on a recording material P in response to image information input from an external device 200 such as a personal computer.

The image forming apparatus 100 is provided with a photosensitive drum 1 which is a drum-shaped (cylindrical) photosensitive member (electrophotographic photosensitive member) as an image bearing member inside an apparatus main body M. The photosensitive drum 1 is constituted by a cylindrical drum substrate made of aluminum or nickel, etc., on which a photosensitive material such as an organic photoconductor (OPC), an amorphous selenium, and an amorphous silicon is provided. The photosensitive drum 1 used in the present Embodiment is the OPC having a negative chargeability with an outer diameter of 24 mm. This photosensitive drum 1 is constituted by a conductive substrate made of an aluminum cylinder, a surface of which includes a photosensitive layer in which a charge-generating layer and a charge-transporting layer are layered in this order from a side of the conductive substrate.

Around the photosensitive drum 1, following means are disposed in order along a rotational direction Rd of the photosensitive drum 1. First, a charging roller 2, which is a roller-shaped charging member, as a charging means is disposed. Next, an exposure device 3 as an exposure means is disposed. Next, a developing device 4 as a developing means is disposed. Next, a transfer roller 5, which is a roller-shaped transfer member (transfer rotation member), as a transfer means is disposed. Next, a charge eliminating needle 20 as a charge eliminating means is disposed. Next, a cleaning device 6 as a cleaning means is disposed.

The charging roller 2 is constituted by, for example, a conductive base shaft (core metal) that also serves as a power supply electrode and an elastic layer that surrounds an outer circumferential surface of the conductive base shaft in a cylindrical shape. The charging roller 2 used in the present Embodiment is an elastic roller including a roller with an outer diameter of 10 mm, a core metal with a diameter of 5 mm, and an elastic layer with a thickness of 2.5 mm. In the present Embodiment, SUS is used for the core metal and a rubber mixture material mixed with nitrile butadiene rubber (NBR) and epichlorohydrin is used for the elastic layer. The charging roller 2 is pressed against the photosensitive drum 1 and is rotationally driven by a rotation of the photosensitive drum 1. The charging roller 2 is disposed so that a rotational axis direction of the charging roller 2 is substantially parallel to a direction (widthwise direction) which is substantially perpendicular to a movement direction of the surface of the photosensitive drum 1. With respect to a rotational direction of the photosensitive drum 1, a position on the photosensitive drum 1 where a charging by the charging roller 2 is performed is a charging position Pa. The charging roller 2 charges the surface of the photosensitive drum 1 by an electric discharge that occurs in at least one of minute gaps formed at an upstream side and a downstream side of a contact portion between the charging roller 2 and the photosensitive drum 1 with respect to the rotational direction of the photosensitive drum 1. This is referred to as a “discharge charging”. In addition, the charging roller 2 also charges the surface of the photosensitive drum 1 by injecting an electric charge at the contact portion between the charging roller 2 and the photosensitive drum 1. This is referred to as an “injection charging”. For simplicity’s sake, the contact portion between the charging roller 2 and photosensitive drum 1 may be considered as the charging position (charging portion) Pa.

In the present Embodiment, the exposure device 3 is constituted by a laser scanner device (laser optical system). With respect to the rotational direction of the photosensitive drum 1, a position on the photosensitive drum 1 where an exposure by the exposure device 3 is performed is an exposing position (exposing portion) Pb.

In the present Embodiment, the developing device 4 uses a non-magnetic one-component developer (toner) as a developer. The developing device 4 is provided with a developing roller **4*a* as a developer bearing member (developing member) and a developer container 4*b*. The developing roller 4*a* abuts the surface of the photosensitive drum 1 upon a development and supplies the toner to a developing portion, which is an opposing (contacting) portion to the photosensitive drum 1. The developing container 4*b* is a container accommodating developer, and the developer accommodated in the developing container 4*b* is supplied to the developing roller 4*a*. Incidentally, the developing device 4 may use, as the developer, a magnetic one-component developer (toner) or a two-component developer which is provided with toner and a carrier. With respect to the rotational direction of the photosensitive drum 1, a position on the photosensitive drum 1 where the toner is supplied by the developing roller 4*a* (in the present Embodiment, a position where the developing roller 4*a*** contacts) is a developing position (developing portion) Pc.

The transfer roller 5 is urged (pressed) toward the photosensitive drum 1 by a transfer pressing spring (not shown), which is an urging member as an urging means, and is pressed against the photosensitive drum 1. As a result, a transfer portion (transfer nip portion) Nt is formed, which is a contact portion between the photosensitive drum 1 and the transfer roller 5. The transfer roller 5 is rotationally driven by the rotation of the photosensitive drum 1. The transfer roller 5 nips and conveys the recording material P with the photosensitive drum 1, and transfers the toner image from the photosensitive drum 1 to the recording material P as voltage is applied. The transfer roller 5 is constituted by, for example, a conductive base shaft (core metal) that also serves as a power supply electrode and an elastic layer that surrounds an outer circumferential surface of the conductive base shaft in a cylindrical shape. As the elastic layer, generally a semi-conductive rubber material constituted by using EPDM, NBR, SBR, urethane rubber, epichlorohydrin, silicone rubber, etc., is used. In a composition of the elastic layer, an appropriate amount of a conductive agent, e.g., an ion conductive agent, is contained. The transfer roller 5 used in the present Embodiment is an elastic roller including a roller with an outer diameter of 14 mm, a core metal with a diameter of 5 mm, and an elastic layer with a thickness of 4.5 mm. In the present Embodiment. SUS is used for the core metal and a rubber mixture material mixed with SBR and epichlorohydrin is used for the elastic layer. In addition, in the present Embodiment, a contacting pressure of the transfer roller 5 against the photosensitive drum 1 is 9.8 N (1 kgf). In addition, in the present Embodiment, an electric resistance value (hereinafter simply referred to as a “resistance value”) of the transfer roller 5 is $2.0\times10^{8}\Omega$ in a state in which the transfer roller 5 is pressed against an aluminum cylinder with the contacting pressure of 9.8 N and rotated at 50 mm/sec, and +1000 V is applied to the transfer roller 5. Incidentally, this resistance value of the transfer roller 5 is a resistance value which is obtained when the transfer roller 5 is left under a condition of a normal temperature and a normal humidity at an initial use (when the transfer roller 5 is new). With respect to the rotational direction of the photosensitive drum 1, a position on the photosensitive drum 1 where the toner image is transferred to the recording material P (a position corresponding to the transfer portion Nt described above) is a transfer position Pd.

The charge eliminating needle 20 eliminates an excessive electric charge on the surface of the recording material P after the transfer and reduces unevenness of the electric potential on the photosensitive drum 1 caused by a separating discharge. As the charge eliminating needle 20, a static eliminating needle made of a thin metal plate material such as a SUS plate or an aluminum plate having a preferable conductivity and provided with a serrated sharp end portion can be used. The charge eliminating needle 20 is disposed so that a tip portion of the charge eliminating needle 20 opposes the surface of the photosensitive drum 1 at a downstream side of the transfer roller 5 with respect to the conveyance direction of the recording material P.

The cleaning device 6 cleans adherent materials such as the toner remaining on the photosensitive drum 1 after the transfer (transfer residual toner). In the present Embodiment, the cleaning device 6 is provided with a cleaning blade **6*a* as a cleaning member disposed so as to contact the surface of the photosensitive drum 1 and a cleaning container 6*b*. With respect to the rotational direction of photosensitive drum 1, a position on the photosensitive drum 1 where a removing of the toner by the cleaning blade 6***a* is performed (in the present Embodiment, a position where the cleaning blade 6*a* contacts) is a cleaning position (cleaning portion) Pe.

In addition, a recording material cassette (sheet feed tray) 7 in which the recording material (transfer material, recording medium, sheet) P such as a paper is accommodated is disposed below the apparatus main body M in the Figure. In addition, along a conveyance path of the recording material P from the recording material cassette 7, a feeding roller 8, a conveyance roller 9, a top sensor 10, a pre-transfer conveyance guide 15, a conveyance guide 11 between the transfer and the fixing, a fixing device 12, a discharging roller 13, and a discharge tray 14 are disposed in this order. In addition, in the apparatus main body M, a control portion 40 that controls the image forming apparatus 100 and a video controller 110 that performs an image processing, etc., are disposed.

Next, an image forming operation of the image forming apparatus 100 according to the present Embodiment will be described. The photosensitive drum 1 is driven and rotated by a drive source (not shown) in a direction of arrow Rd in the Figure (clockwise direction) at a circumferential speed (process speed) of 300 mm/sec. The surface of the rotating photosensitive drum 1 is charged by the charging roller 2 to a predetermined potential (dark portion potential, charging potential) of the same polarity as the normal charging polarity of the toner (negative polarity in the present Embodiment) in a substantially uniform manner. During the charging process, a charge voltage (charge bias), which is a direct current voltage of negative polarity, is applied to the charging roller 2 from a charging power supply (high voltage power supply) 21 via a charging current detection circuit 22. In the present Embodiment, as an example, the charge voltage of −1100 V is applied to the charging roller 2 and the dark portion potential of −500 V is formed on the surface of the photosensitive drum 1.

The surface of the photosensitive drum 1 after the charging is scanned and exposed by the exposure device 3 according to the image information. The video controller 110 of the image forming apparatus 100 processes image information input to the image forming apparatus 100 from the external device 200 to generate time-series electric digital pixel signals, which are input to the control portion 40. The exposure device 3, which is controlled by the control portion 40, outputs a laser beam L modulated according to the above time-series electric digital pixel signals, and scans and exposes the charged surface of the photosensitive drum 1 with the laser beam L By this, an electrostatic latent image (electrostatic image) is formed on the photosensitive drum 1. In the present Embodiment, the electric charge of a portion exposed by the exposure device 3 on the photosensitive drum 1 is removed, and a light portion potential of −100 V is formed on the surface of the photosensitive drum 1. As a result, the electrostatic latent image is formed on the photosensitive drum 1 by a contrast between the above dark portion potential and the above light portion potential.

The electrostatic latent image formed on the photosensitive drum 1 is developed (visualized) by the toner supplied by the developing device 4 to form the toner image (toner figure, developer image) on the photosensitive drum 1. During the development, a developing voltage (developing bias), which is a direct current voltage of the same polarity as the normal charging polarity of the toner (negative polarity in the present Embodiment), is applied to the developing roller 4*a* from a developing power source (high voltage power source) 16. In the present Embodiment, as an example, the developing voltage of −380 V is applied to the developing roller 4*a*. In the present Embodiment, the toner charged with the same polarity as the charging polarity of the photosensitive drum 1 (negative polarity in the present Embodiment) adheres to the exposing portion (image portion) on the photosensitive drum 1, where the absolute value of the potential is lowered by being exposed after being charged in the substantially uniform manner (reversal development method). In the present Embodiment, the normal charging polarity of the toner, which is a primary charging polarity of the toner during the development, is negative polarity.

The toner image formed on the photosensitive drum 1 is transferred onto the recording material P by an action of the transfer roller 5 in the transfer portion Nt. During the transfer, a transfer voltage (transfer bias), which is a direct current voltage having a reverse polarity to the normal charging polarity of the toner (in the present Embodiment, a positive polarity), is applied to the transfer roller 5 from a transfer power source (high voltage power source) 18 via a transfer current detection circuit 19 as a transfer current detection means. In the present Embodiment, as an example, the transfer voltage of about +1000 V is applied to the transfer roller 5. By this, the toner image on the photosensitive drum 1 is electrostatically transferred to a predetermined position on the recording material P. The recording material P is accommodated in the recording material cassette 7 as a recording material accommodating portion, and is fed one by one from the recording material cassette 7 by the feeding roller 8 as a feeding member. The recording material P is conveyed by the conveyance roller 9 as a conveyance member, and is supplied to the transfer portion Nt along the pre-transfer conveyance guide 15 as a guide member. The conveyance roller 9 is controlled based on a detection result of a leading end of the recording material P with respect to the conveyance direction of the recording material P by the top sensor 10 as a recording material detection means, etc., and supplies the recording material P to the transfer portion Nt so as to align a timing with the toner image on the photosensitive drum 1.

The excessive electric charge on the surface of the recording material P, to which the toner image is transferred at the transfer portion Nt, is eliminated by the charge eliminating needle 20. The recording material P after passing through the charge eliminating needle 20 is conveyed along the conveyance guide 11 between the transfer and the fixing as a guide member to the fixing device 12 as a fixing means. The fixing device 12 is provided with a fixing roller 12*a* that incorporates a heater and a pressing roller 12*b* that is in pressure contact with the fixing roller 12*a*. The fixing device 12 applies heat and pressure to the recording material P bearing an unfixed toner image that passes through a nip portion between the fixing roller 12*a* and the pressing roller 12*b* to fix (melt and fix) the toner image on the recording material P.

In a case of a single-sided image formation, the recording material P on one side of which the toner image is fixed by the fixing device 12 is discharged (output) by the discharging roller 13 onto the discharge tray 14 formed on an upper surface of the apparatus main body M in the Figure. Incidentally, the image forming apparatus 100 may have a configuration capable of a double-sided image formation in which the image forming apparatus 100 reverses a front side and back side of the recording material P on a first side of which the toner image is fixed, reverses the conveyance direction of the recording material P to convey the recording material P again to the transfer portion Nt, and transfers and fixes the toner image on a second side of the recording material P.

On the other hand, adherent materials such as the toner remaining on the surface of the photosensitive drum 1 without being transferred to the recording material P during the transfer (transfer residual toner) are removed from the surface of the photosensitive drum 1 and collected by the cleaning device 6. The cleaning device 6 scrapes off the adherent materials such as the transfer residual toner from the surface of the rotating photosensitive drum 1 with the cleaning blade 6*a* and accommodates the scraped adherent materials in the cleaning container 6*b*.

By repeating the above operation, the image formation can be performed one after another. In the present Embodiment, the image forming apparatus 100 can execute a print operation at a print speed of 50 sheets per minute.

Incidentally, in the present Embodiment, the image forming apparatus 100 does not include a means for lowering the surface potential of the photosensitive drum 1 by irradiating light on the surface of the photosensitive drum 1 downstream of the transfer position Pd and upstream of the charging position Pa with respect to the rotational direction of the photosensitive drum 1 (pre-exposure apparatus).

In addition, the photosensitive drum 1 and at least one of the charging roller 2, developing device 4, and cleaning device 6 as process means acting thereon may integrally constitute a cartridge (process cartridge) that can be attached to and detached from the apparatus main body M.

The control portion 40 is configured to include a CPU 41 as a calculation control means, which is a central element that performs arithmetic processing, memories such as a ROM 41*a* and a RAM 41*b* as storage means, input/output portions (not shown) that control an exchange of signals between the control portion 40 and each portion outside the control portion 40, etc. The RAM 41*b*, which is a rewritable memory, stores information input to the control unit 40, detected information, calculation results, etc., and the ROM 41*a* stores control programs, data tables calculated in advance, etc. The CPU 41 and the memories such as the ROM 41*a* and the RAM 41*b* are mutually capable of transferring and reading data. The CPU 41 can control various operations related to image formation, etc., by executing various programs stored in the ROM 41*a*, while using the RAM 41*b* as a work area. In particular, in the present Embodiment, the control portion 40 can execute an exposing operation to expose at least a non-transfer area E of the photosensitive drum 1, which will be described below.

Here, the image forming apparatus 100 performs a print job (print operation), which is a series of operations to form and output an image on the single recording material P or images on the multiple recording materials P, started by a single start instruction. The print job generally includes an image forming process, a pre-rotation process, a sheet (paper) interval process in a case where images are formed on the multiple recording materials P, and a post-rotation process. The image forming process is a period during which a formation of the electrostatic latent image of an image to be actually formed on and output to the recording material P, a formation of the toner image, and a transfer of the toner image are performed, and an image forming time refers to this period. More specifically, a timing of the image forming time differs between positions where each of processes of the formation of the electrostatic latent image, the formation of the toner image, and the transfer of the toner image is performed, and corresponds to a period when an image forming area on the photosensitive drum 1 is passing through each of the above positions. The pre-rotation process is a period between when the start instruction is input and when an image actually begins to be formed, and is a period when a preparatory operation prior to the image forming process is performed. The sheet interval process (image interval process, recording material interval process) corresponds to a period between when one recording material P has passed and when the next recording material P comes in a case where image formations onto a plurality of recording materials P are continuously performed (continuous image formation, continuous printing). The post-rotation process is a period during which an organizing operation (preparatory operation) is performed after the image forming process. The non-image formation time, which is a period other than the image forming time, includes the pre-rotation process, the sheet interval process, and the post-rotation process described above, and further includes a pre-multi-rotation process, which is a preparatory operation when the image forming apparatus 100 is turned on or recovers from asleep state, etc. More specifically, a timing of the non-image forming time corresponds to a period when a non-image forming area on the photosensitive drum 1 is passing through each of positions where the formation of the electrostatic latent image, the formation of the toner image, and the transfer of the toner image mentioned above are performed. Incidentally, the image forming area on the photosensitive drum 1 or on the recording material P is an area where the toner image that is transferred to the recording material P and output from the imaging apparatus 100 can be formed, which is set in advance according to a size of the recording material P, etc., and the non-image forming area is an area other than the image forming area. Incidentally, in the present Embodiment, in predetermined areas of a leading end portion and a trailing end portion of the recording material P with respect to the conveyance direction of the recording material P, marginal portions which are the non-image forming areas are disposed, respectively. In addition, in the present Embodiment, also in predetermined areas of both ends of the recording material P with respect to a direction that is substantially perpendicular to the conveyance direction of the recording material P, the marginal portions which are the non-image forming areas are disposed, respectively.

(2) Positional Relationships with Respect to the Longitudinal Direction

Figure 2:
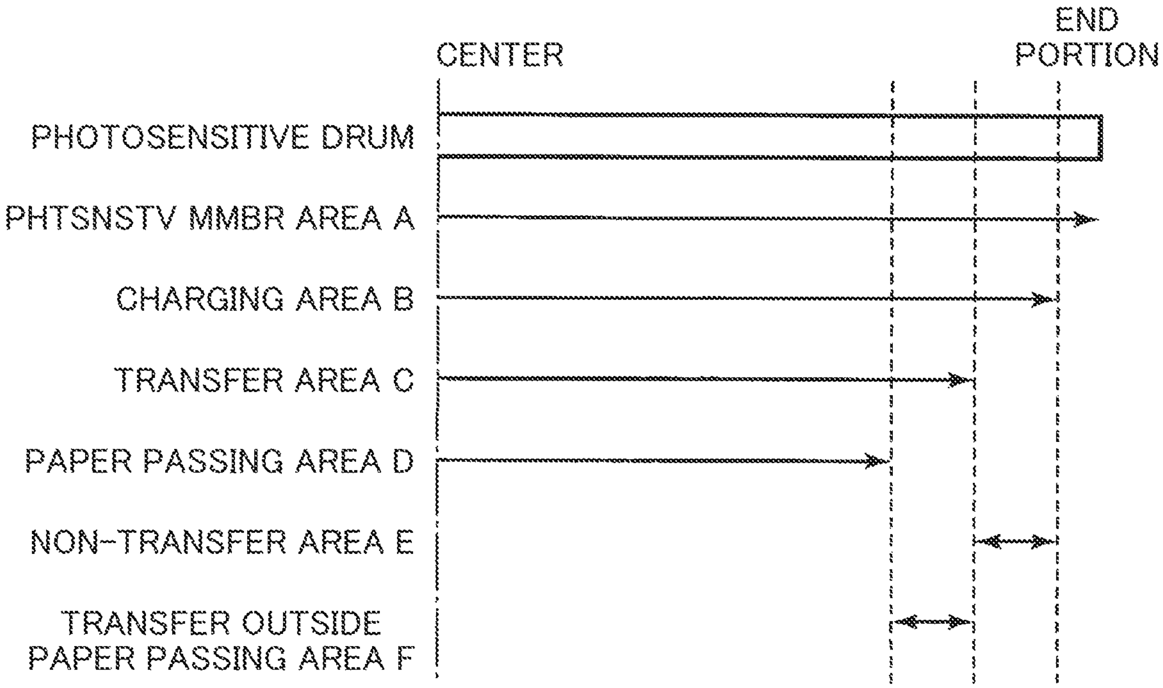
FIG. 2 is a schematic view illustrating positional relationships among each portion around a photosensitive drum with respect to a longitudinal direction.

FIG. 2 is a schematic view for illustrating positional relationships of each portion around the photosensitive drum 1 with respect to the direction that is substantially perpendicular to the movement direction of the surface of the photosensitive drum 1 (conveyance direction of the recording material P). Incidentally, the direction that is substantially perpendicular to the movement direction of the surface of the photosensitive drum 1 (conveyance direction of the recording material P) (i.e., the direction that is substantially parallel to the rotational axis direction of the charging roller 2) may be referred to as the "longitudinal direction". Although the positional relationships may vary depending on the size (in particular, a width in the direction substantially perpendicular to the conveyance direction) of the recording material P used for the image formation, FIG. 2 illustrates positional relationships in a case where the size of the recording material P is a LTR size.

In FIG. 2, a "photosensitive member area A" represents an area with respect to the longitudinal direction or a width of the area where the photosensitive layer of the photosensitive drum 1 is formed. In addition, a "charging area (charging portion) B" represents an area of the charging roller 2 with respect to the longitudinal direction or a width of the area that can contact the surface of the photosensitive drum 1. In addition, a "transfer area (transfer portion) C" represents an area of the transfer roller 5 with respect to the longitudinal direction or a width of the area that can contact the surface of the photosensitive drum 1. In addition, a "paper passing area D" represents an area with respect to the longitudinal direction or a width of the area through which the recording material P passes at the transfer portion Nt. In addition, the "non-transfer area E" represents an area with respect to the longitudinal direction or a width of the area where the charging roller 2 contacts the photosensitive drum 1 and where the transfer roller 5 does not contact the photosensitive drum 1 (i.e., an area of difference between the charging area B and the transfer area C, or a width of the area). In addition, a "transfer outside paper passing area F" represents an area with respect to the longitudinal direction or a width of the area where the transfer roller 5 contacts the photosensitive drum 1 and where the recording material P does not pass through at the transfer portion Nt (i.e., an area of difference between the transfer area C and the paper passing area D, or a width of the area). In other words, with respect to the longitudinal direction, an area on the surface of the photosensitive drum 1 that contacts with the recording material P at the transfer portion Nt is the paper passing area D, and an area outside the paper passing area D and inside the transfer area C is the transfer outside paper passing area F. Incidentally, for convenience sake, areas on the photosensitive drum 1 corresponding to the "charging area B", the "transfer area C", the "paper passing area D", the "non-transfer area E", and the "transfer outside paper passing area F" described above are also referred to as the "charging area B", the "transfer area C", the "paper passing area D", the "non-transfer area E", and the "transfer outside paper passing area F", respectively.

In the present Embodiment, the photosensitive member area A, the charging area B, the transfer area C, and the paper passing area D are disposed so that centers of these areas with respect to the longitudinal direction are approximately coincident with a center of the image forming area (area where toner images can be formed) with respect to the longitudinal direction, respectively (center reference). Therefore, among the above areas, areas with a relatively short width are encompassed inside areas with a relatively long width. Incidentally, in FIG. 2, a range from the center to one side of the end portion with respect to the longitudinal direction is illustrated.

In the present Embodiment, in the longitudinal direction, the transfer area C is shorter than the charging area B, and the end portion of the surface of the photosensitive drum 1 in the longitudinal direction includes the non-transfer area E in contact with the charging roller 2 and in no contact with the transfer roller 5.

Figure 3A:
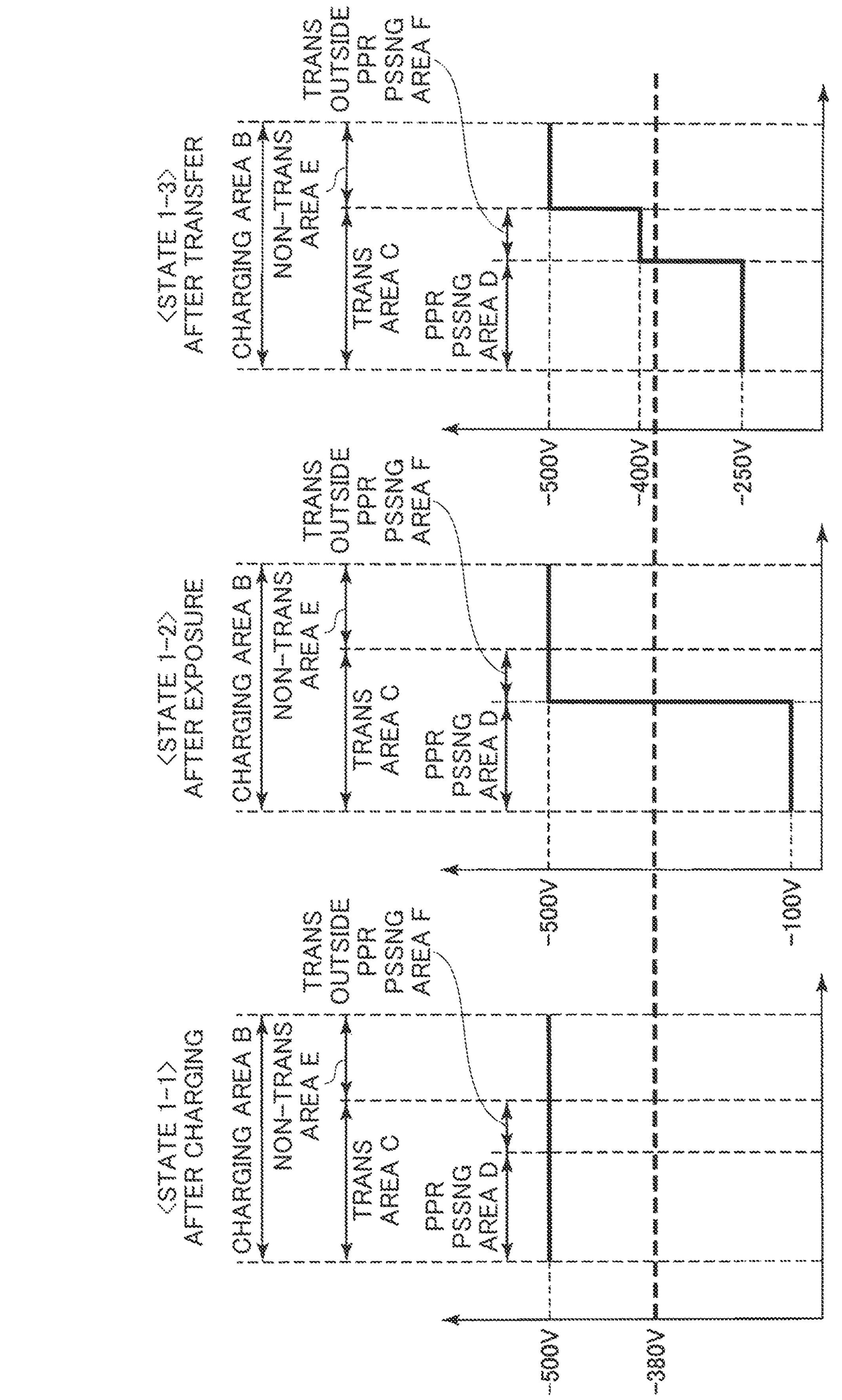
FIG. 3A is an explanatory view illustrating arise of a surface potential of the photosensitive drum.
Figure 3B:
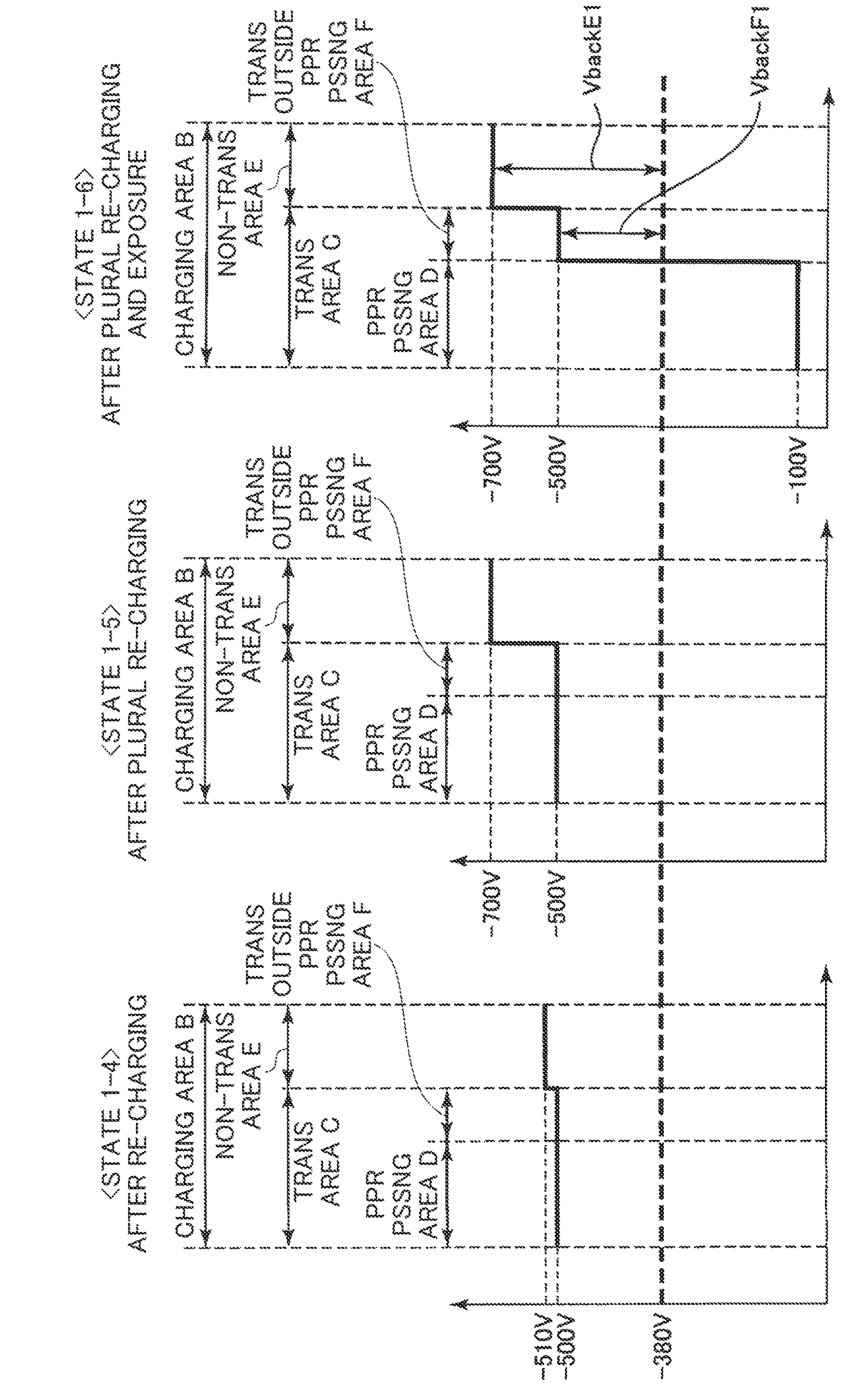
FIG. 3B is an explanatory view illustrating the rise of the surface potential of the photosensitive drum.

(3) Rise of the Surface Potential in the Non-Transfer Area of the Photosensitive Drum Next, a transition in which the surface potential in the non-transfer area E of the photosensitive drum 1 rises in a print operation in a case where the exposing operation of the present Embodiment described below is not performed will be described using FIG. 3A and FIG. 3B. In FIG. 3A and FIG. 3B, a horizontal axis represents a position on the photosensitive drum 1 with respect to the longitudinal direction, and illustrates the charging area B, the transfer area C, the paper passing area D, the non-transfer area E and the transfer outside paper passing area F described above. In addition, in FIG. 3A and FIG. 3B, a vertical axis represents the surface potential of the photosensitive drum 1, and the further upward FIG. 3A and FIG. 3B, the higher the surface potential of the photosensitive drum 1 on a negative side is (i.e., an absolute value of the surface potential of the negative polarity is high). Incidentally, in FIG. 3A and FIG. 3B, a range of one side of the end portion with respect to the longitudinal direction is illustrated. In addition, the surface potential of the photosensitive drum 1 illustrated in FIG. 3A and FIG. 3B, which will be described below, is a value that may vary depending on various conditions such as environment, the type of the recording material P. In addition, in the following description, "after charging" means after passing through the charging position Pa, "before exposure" means before reaching the exposing position Pb, "after exposure" means after passing through the exposing position Pb, "before transfer" means before reaching the transfer position Pd (transfer portion Nt), "after transfer" means after passing through the transfer position Pd (transfer portion Nt), and "before charging" means before reaching the charging position Pa, respectively.

First, a state 1-1 shows the surface potential of the photosensitive drum 1 after charging (and before exposure), which is immediately after a start of the print operation. In the state 1-1, the surface of the photosensitive drum 1 is charged to a predetermined dark portion potential Vd in a substantially uniform manner by the charging roller 2 to which a predetermined charge voltage is applied. In the example of FIG. 3A and FIG. 3B, as an example, a charge voltage of −1100 V is applied to the charging roller 2 and the surface of the photosensitive drum 1 is charged to the dark portion potential Vd of −500 V during the charging.

Next, a state 1-2 shows the surface potential of the photosensitive drum 1 after exposure (and before transfer). The electrostatic latent image (electrostatic image) is formed in an image portion (image area, print portion, print area) in the paper passing area D by irradiating the laser beam L and the exposure being performed by the exposure device 3. In the example of FIG. 3A and FIG. 3B, as an example, the image portion within the paper passing area D is exposed by the exposure device 3 with an exposure amount of 0.3 $\mu J/cm^2$ and the light portion potential of −1 M V is formed on the surface of the photosensitive drum 1.

Next, a state 1-3 shows the surface potential of the photosensitive drum 1 after transfer (and before recharging). When the recording material P passes through the transfer portion Nt, a positive transfer voltage is applied to the transfer roller 5 at the transfer portion Nt. Therefore, the surface potential in the transfer outside paper passing area F of the photosensitive drum 1, where the photosensitive drum 1 and the transfer roller 5 are in contact directly while the paper is passing, is lowered. On the other hand, in the non-transfer area E, since the photosensitive drum 1 and the transfer roller 5 are not in contact, no transfer voltage of the positive polarity is applied thereto. In addition, the image forming apparatus 100 of the present Embodiment does not include the means for lowering the surface potential of the photosensitive drum 1 by irradiating light onto the surface of the photosensitive drum 1 after transfer and before charging, such as the pre-exposure means, for example. Therefore, the surface potential in the non-transfer area E of the photosensitive drum 1 is substantially not lowered at all. As a result, a potential difference between the surface potential in the transfer outside paper passing area F of the photosensitive drum 1 and the surface potential in the non-transfer area E of the photosensitive drum 1 arises. In addition, the surface potential in the image portion within the paper passing area D of the photosensitive drum 1 (light portion potential) fluctuates within a range between the light portion potential and a developing potential as a result of an effect received at the developing position Pc and the transfer portion Nt, as described below. In the example of FIG. 3A and FIG. 3B, as an example, after the transfer, the surface potential in the transfer outside paper passing area F of the photosensitive drum 1 is −400 V, w % bile the surface potential in the non-transfer area E of the photosensitive drum 1 remains −500 V. In addition, in the example of FIGS. 3A and 3B, as an example, the surface potential in the image portion within the paper passing area D of the photosensitive drum 1 fluctuates from −100 V to −250 V after the transfer. This is because the surface potential in the image portion within the paper passing area D of the photosensitive drum 1 is affected due to a supplement of the toner to the image portion (a portion with the light portion potential) by the developing roller 4*a* at the developing position Pc and an application of the voltage having the positive polarity by the transfer roller 5 via the recording material Pat the transfer portion Nt. Incidentally, a potential difference between the surface potential in the transfer outside paper passing area F (or the transfer area C) of the photosensitive drum 1 and the surface potential in the non-transfer area E of the photosensitive drum 1 is simply referred to as a potential difference between the transfer outside paper passing area F (or the transfer area C) and the non-transfer area E.

Next, a state 1-4 shows the surface potential of the photosensitive drum 1 after recharging (and before exposure). The surface of the photosensitive drum 1 is charged again under a condition where the potential difference is generated between the transfer area C (constituted by the paper passing area D and the transfer outside paper passing area F) and the non-transfer area E as described above. In the state 1-4, a predetermined charge voltage (−1100 V) is applied to the charging roller 2, as in the state 1-1. The surface potential in the transfer area C of the photosensitive drum 1 returns to the predetermined dark portion potential Vd (−500 V), as in the state 1-1, after recharging. On the other hand, since the surface potential in the non-transfer area E of the photosensitive drum 1 is already equivalent to the dark portion potential Vd, the discharge charging does not occur, however, the surface potential thereof rises to −510 V, which is higher than the predetermined dark portion potential Vd, due to the injection charging after recharging.

A state 1-5 shows the surface potential of the photosensitive drum 1 after passing through the charging position Pa multiple times (after recharging multiple times and before exposure) with the charge voltage (−1100 V) being applied to the charging roller 2 constantly (continuously). The surface potential in the transfer area C of the photosensitive drum 1 returns to the predetermined dark portion potential Vd (−500 V), as in the state 1-1, after charging. On the other hand, the surface potential in the non-transfer area E of the photosensitive drum 1 after charging gradually rises due to the injection charging that occurs at each time the surface of the photosensitive drum 1 passes through the charging position Pa. In the example of FIG. 3A and FIG. 3B, as an example, the surface potential in the non-transfer area E of the photosensitive drum 1 becomes −700V.

Next, a state 1-6 shows the surface potential of the photosensitive drum 1 after exposure (and before transfer) when the exposure with the laser beam L is performed by the exposure device 3 in the same manner as the state 1-2 under a condition where the surface potential in the non-transfer area E of the photosensitive drum 1 has risen after the multiple recharges. As in the state 1-2, the surface potential in the image portion within the paper passing area D of the photosensitive drum 1 falls to the predetermined light portion potential. On the other hand, the surface potential in the non-transfer area E of the photosensitive drum 1 remains elevated, as in the state 1-5.

If the surface potential in the non-transfer area E of the photosensitive drum 1 rises excessively, the potential difference between a core metal portion of the transfer roller 5 and the non-transfer area E of the photosensitive drum 1 becomes large, which may cause a discharge to occur. The discharge may result in damage such as leakage marks to the photosensitive drum 1 due to an insulation breakdown. When the charge voltage is applied to the charging roller 2 in a presence of a damaged portion, current may concentrate in the damaged portion, causing the charge voltage to drop. As a result, the photosensitive drum 1, including other areas, cannot be brought to the desired surface potential, and a streak image in the longitudinal direction may occur due to the charging defect. Therefore, it is desirable to suppress the excessive rise of the surface potential in the non-transfer area E of the photosensitive drum 1.

Figure 4A:
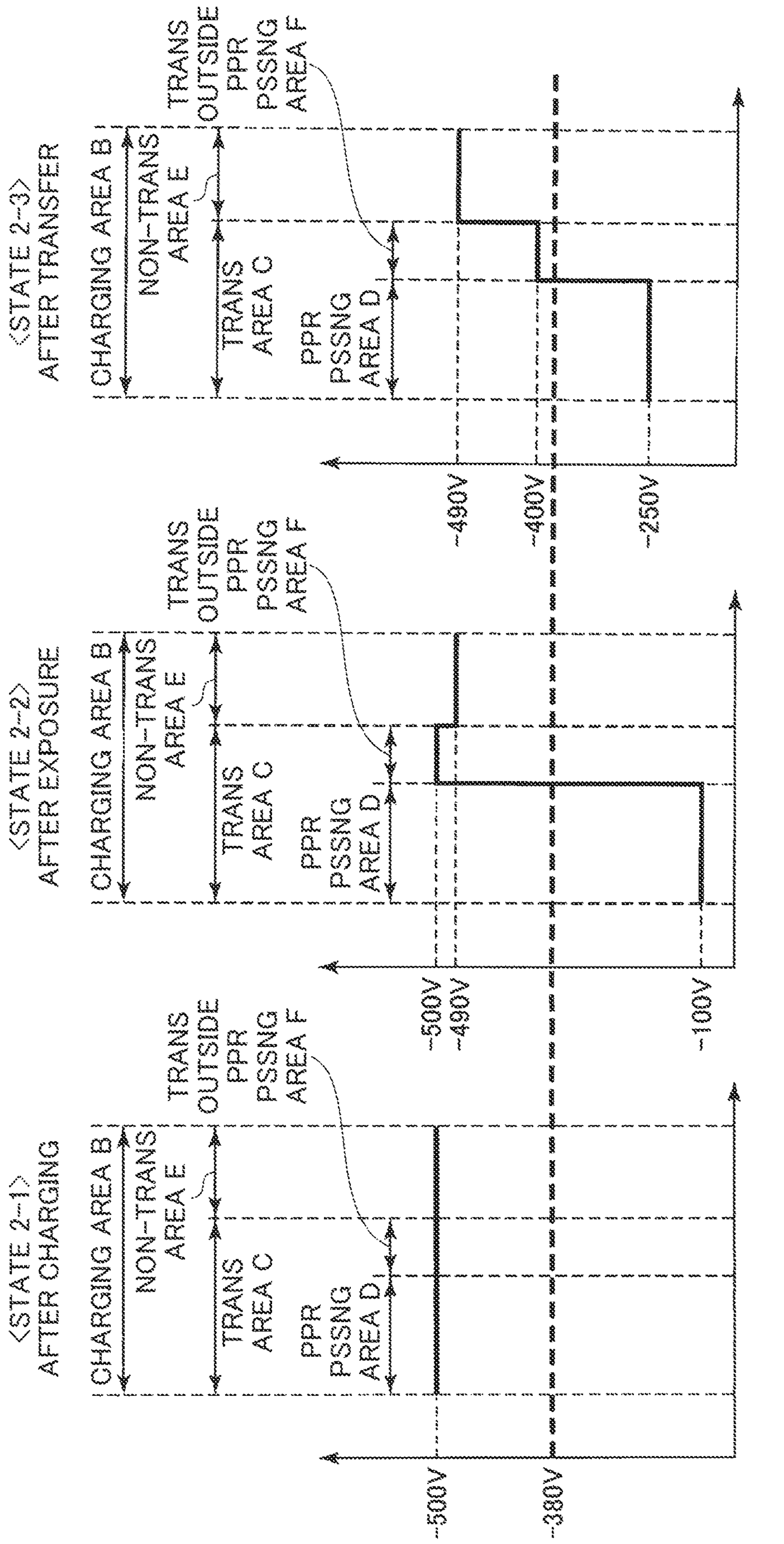
FIG. 4A is an explanatory view illustrating transitions of the surface potential of the photosensitive drum according to an Embodiment 1.
Figure 4B:
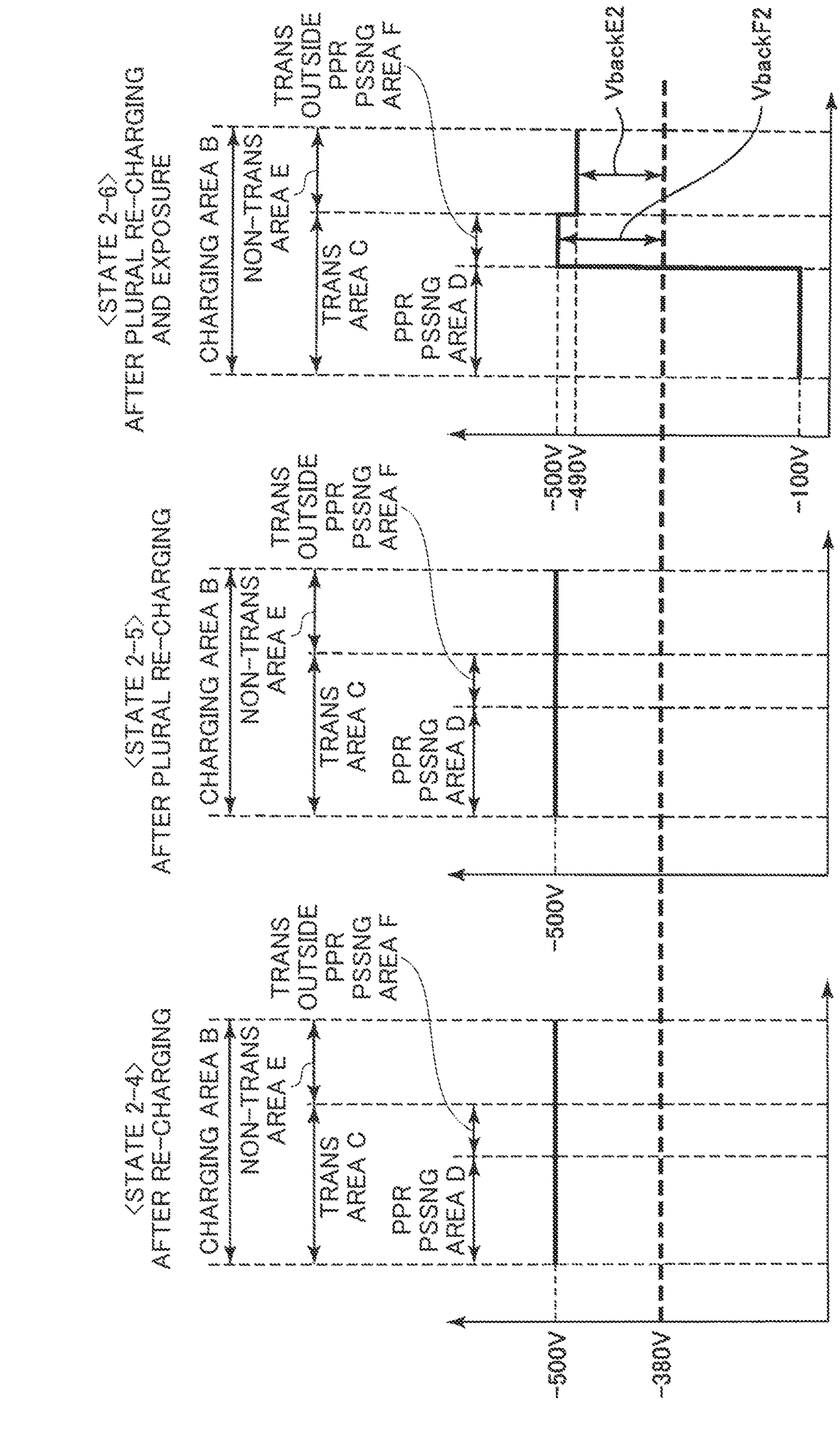
FIG. 4B is an explanatory view illustrating transitions of the surface potential of the photosensitive drum according to the Embodiment 1.

(4) Transition of the Surface Potential of the Photosensitive Drum when an Exposing Operation of the Present Embodiment is Performed Next, a transition of the surface potential of the photosensitive drum 1 in the print operation in a case where an exposing operation of the present Embodiment described below is performed will be described using FIG. 4A and FIG. 4B. In the present Embodiment, the excessive rise of the surface potential in the non-transfer area E of the photosensitive drum 1 is suppressed by executing the exposing operation in which the non-transfer area E of the photosensitive drum 1 is exposed by the exposure device 3. Meanings of a horizontal axis and a vertical axis of FIG. 4A and FIG. 4B are the same as those of FIG. 3A and FIG. 3B, respectively.

First, a state 2-1 shows the surface potential of the photosensitive drum 1 after charging (and before exposing), which is immediately after the start of the printing operation. In the state 2-1, as in the state 1-1 of FIG. 3A, the surface of the photosensitive drum 1 is charged to the predetermined dark portion potential Vd in the substantially uniform manner by the charging roller 2 to which the predetermined charge voltage is applied. In an example of FIG. 4A and FIG. 4B, as in the state 1-1 of FIG. 3A, as an example, the charge voltage of −1100 V is applied to the charging roller 2 and the surface potential of the photosensitive drum 1 is charged to the dark portion potential Vd of −500 V during the charging.

Next, a state 2-2 shows the surface potential of the photosensitive drum 1 after exposure (and before transfer). In the present Embodiment, the excessive rise of the surface potential in the non-transfer area E of the photosensitive drum 1 is suppressed by executing the exposing operation in which the non-transfer area E of the photosensitive drum 1 is exposed by the exposure device 3. In other words, the electrostatic latent image (electrostatic image) is formed in the image portion within the paper passing area D by irradiating the laser beam L and the exposure being performed by the exposure device 3. In addition, in the present Embodiment, at this moment, the exposure is performed by irradiating the laser beam L by the exposure device 3 also to the non-transfer area E, in anticipation of an increasing amount of the surface potential after the recharging, as in the state 1-4 of FIG. 3B. By this, the surface potential in the non-transfer area E of the photosensitive drum 1 is made lower than the surface potential in the transfer outside paper passing area F of the photosensitive drum 1. In the example of FIG. 4A and FIG. 4B, as in the state 1-2 of FIG. 3A, as an example, the image portion within the paper passing area D is exposed by the exposure device 3 with the exposure amount of 0.3 μJ/cm$^2$ and the light portion potential of −100 V is formed on the surface of the photosensitive drum 1. On the other hand, the non-transfer area E is exposed by the exposure device 3 with a lower exposure amount (here, also referred to as "weak exposure") than the exposure amount for the image portion as described above and the surface potential thereof is lowered. In the example of FIG. 4A and FIG. 4B, as an example, the non-transfer area E is exposed by the exposure device with the exposure amount of 0.005 μJ/cm$^2$ and the surface potential is lowered. In the present Embodiment, in order to realize such a low exposure amount, a weak exposure light source (not shown) is provided in the exposure device 3 in addition to a light source for exposing the image portion within the paper passing area D. In the example of FIG. 4A and FIG. 4B, as an example, the surface potential in the non-transfer area E of the photosensitive drum 1 is lowered to −490 V, which is lower than the surface potential of −500 V in the transfer outside paper passing area F of the photosensitive drum 1. In the present Embodiment, the surface potential in the non-transfer area E of the photosensitive drum 1 is lowered to −490 V; however, it is not limited to that voltage as long as an absolute value of the voltage is lower than −500 V that is the surface potential in the transfer outside paper passing area F.

Thus, in the present Embodiment, after exposure (and before transfer), the absolute values of the surface potential of the photosensitive drum 1 are in a relationship as the non-transfer area E<the transfer outside paper passing area F. In addition, in the present Embodiment, the transfer outside paper passing area F of the photosensitive drum 1 is not exposed by the exposure device 3. That is, in the present Embodiment, during the exposure, the exposure amounts (exposure amount per unit area) by the exposure device 3 are in a relationship as the non-transfer area E >the transfer outside paper passing area F. By satisfying the relationship of the surface potential or the relationship of the exposure amount, the rise of the surface potential in the non-transfer area E of the photosensitive drum 1, as in the state 1-4 of FIG. 3B, can be suppressed.

Next, a state 2-3 shows the surface potential of the photosensitive drum 1 after transfer (and before recharging). A change of the surface potential of the photosensitive drum 1 in the state 2-3 is the same as in the state 1-3 of FIG. 3A. However, the surface potential in the non-transfer area E of the photosensitive drum 1 under a condition where the transfer roller 5 does not contact and the exposure by the exposure device 3 is performed is different from the state 1-3 of FIG. 3A and keeps the surface potential after exposure in the state 2-2. In the example of FIG. 4A and FIG. 4B, as an example, the surface potential in the transfer outside paper passing area F of the photosensitive drum 1 becomes −400 V after transfer, and the surface potential in the non-transfer area E of the photosensitive drum 1 becomes −490 V. In addition, in the example of FIG. 4A and FIG. 4B, as an example, the surface potential in the image portion within the paper passing area D of the photosensitive drum 1 becomes −250 V after transfer.

Next, a state 2-4 shows the surface potential of the photosensitive drum 1 after recharging (and before exposure). The surface of the photosensitive drum 1 is charged again by the charging roller 2 as in the state 1-4 of FIG. 3B. The surface potential in the transfer area C of the photosensitive drum 1 returns to the predetermined dark portion potential Vd (−500 V), as in the state 1-4 in FIG. 3B, after recharging. In addition, the surface potential of the photosensitive drum 1 after recharging becomes the predetermined dark portion potential Vd (−500 V) in the non-transfer area E as well as in the transfer area C because the surface potential is lowered by the injection charging in advance in anticipation of the rise of the surface potential in the state 2-3. That is, the rise of the surface potential in the non-transfer area E of the photosensitive drum 1, as in the state 1-4 of FIG. 3B, is suppressed, and the surface potential of the photosensitive drum 1 of the state 2-4 returns to the surface potential of the photosensitive drum 1 of the state 2-1.

A state 2-5 shows the surface potential of the photosensitive drum 1 after passing through the charging position Pa multiple times (after recharging multiple times and before exposure) with the charge voltage (−1100 V) being applied to the charging roller 2 constantly (continuously). As explained with respect to the state 2-4, the further rise of the surface potential in the non-transfer area E of the photosensitive drum 1 as shown in the state 1-5 of FIG. 3B is suppressed by executing the exposing operation in the present Embodiment. That is, the surface potential of the photosensitive drum 1 keeps the flat surface potential (−500 V) with respect to the longitudinal direction as in the state 2-1 and the state 2-4 after charging.

Next, a state 2-6 shows the surface potential of the photosensitive drum 1 after exposure (and before transfer) when the exposure with the laser beam L is performed by the exposure device 3 in the same manner as the state 2-2 under a condition of the state 2-5. As explained with respect to the state 2-5, since the rise of the surface potential in the non-transfer area E of the photosensitive drum 1 is suppressed, the surface potential of the photosensitive drum 1 in the state 2-6 becomes the same as the surface potential of the photosensitive drum 1 in the state 2-2.

As described above, by executing the exposing operation of the present Embodiment, the rise of the surface potential in the non-transfer area E of the photosensitive drum 1 as shown in FIG. 3A and FIG. 3B can be suppressed.

(5) Evaluation Test

Figure 5:
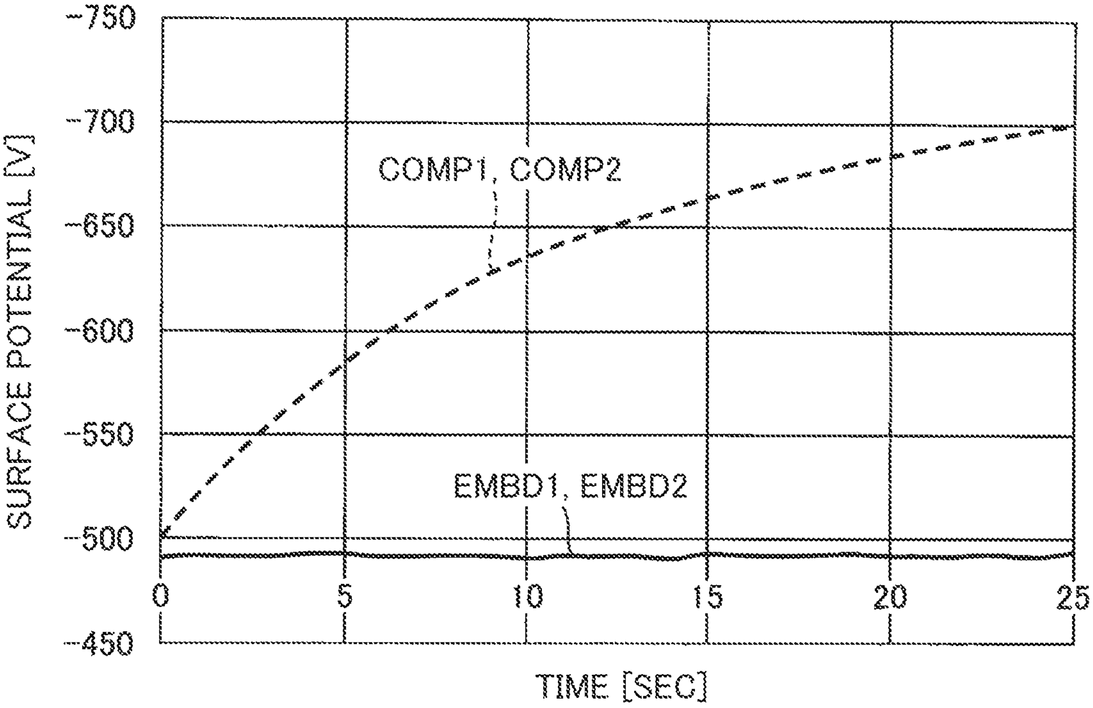
FIG. 5 is a graph illustrating transitions of the surface potential in an end portion of the photosensitive drum according to Embodiments and Comparative Examples.

Next, results of evaluation tests performed to evaluate degrees of the rise of the surface potential in the non-transfer area E of the photosensitive drum 1 with respect to the present Embodiment and a Comparative Example 1 will be described. In the present Embodiment, the exposing operation described using FIG. 4A and FIG. 4B was performed, and in the Comparative Example 1, the exposing operation described using FIG. 3A and FIG. 3B was performed. A configuration and an operation of the image forming apparatus 100 of the Comparative Example 1 are substantially the same as those of the image forming apparatus 100 of the present Embodiment except the above point. FIG. 5 shows transitions of the surface potential in the non-transfer area E of the photosensitive drum 1 after exposure and before transfer when continuous image formations were performed on 20 sheets of the LTR size as the recording material P. In FIG. 5, a solid line shows a transition of the surface potential in a case where the exposing operation of the present Embodiment is performed and a dashed line shows a transition of the surface potential in a case where the exposing operation of the Comparative Example 1 is performed.

In the Comparative Example 1, since there is no means to counteract the rise of the surface potential in the non-transfer area E of the photosensitive drum 1, the surface potential in the non-transfer area E of the photosensitive drum 1 gradually rises to an excessive potential due to the injection charging from charging roller 2.

On the other hand, in the present Embodiment, the rise of surface potential due to the injection charging is counteracted by exposing the non-transfer area E, and the rise of the surface potential in the non-transfer area E of the photosensitive drum 1 is suppressed.

Thus, in the present Embodiment, the image forming apparatus 100 comprises the rotatable photosensitive member 1, the rotatable charging member 2 configured to form the charging portion B in contact with the photosensitive member 1 and to charge the surface of the photosensitive member 1 at the charging portion B, the exposure device 3 configured to expose the surface of the photosensitive member 1 charged by the charging member 2 and to form the electrostatic image on the surface of the photosensitive member 1, the developing member 4*a* configured to supply the toner to the electrostatic image formed on the surface of the photosensitive member 1 and to form the toner image, the transfer member 5 configured to form the transfer portion Nt in contact with the surface of the photosensitive member 1 and to transfer the toner image to the recording material P from the surface of the photosensitive member 1 at the transfer portion Nt by application of the voltage and the control portion 40 configured to control the exposure device 3, wherein in the rotational axis direction of the charging member 2, a width of the transfer portion Nt is shorter than a width of the charging portion B, and the end portion of the surface of the photosensitive member 1 in the rotational axis direction includes the non-transfer area E in contact with the charging member 2 and in no contact with the transfer member 5. And, in the present Embodiment, in the rotational axis direction, the area in contact with the recording material P at the transfer portion Nt of the surface of the photosensitive member 1 is defined as the paper passing area D and the area outside of the paper passing area D and inside of the transfer portion Nt is defined as a transfer outside paper passing area F, wherein the control portion 40 is capable of performing the exposing operation such that the exposure device 3 exposes at least the non-transfer area E of the photosensitive member 1 during the rotation of the photosensitive member 1, controls the exposure device 3 to form the surface potential on the surface of the photosensitive member 1 downstream of the exposing portion Pb where the surface of the photosensitive member 1 is exposed by the exposing operation and upstream of the transfer portion Nt in the rotational direction of the photosensitive member 1, and controls the exposure device 3 such that the absolute value of the surface potential formed on the non-transfer area E is smaller than the absolute value of the surface potential formed on the transfer outside paper passing area F downstream of the exposing portion Pb and upstream of the transfer portion Nt in the rotational direction of the photosensitive member 1. In addition, in other words, in the present Embodiment, the control portion 40 is capable of performing the exposing operation such that the exposure device 3 exposes at least the non-transfer area E of the photosensitive member 1 during the rotation of the photosensitive member 1, and controls the exposure device 3 such that the exposure amount to the non-transfer area E is larger than the exposure amount to the transfer outside paper passing area F in the exposing operation. In the present Embodiment, the control portion 40 controls the exposure device 3 so as to expose at least the non-transfer area E of the photosensitive member 1 and the transfer outside paper passing area F in the exposing operation. In addition, in the present Embodiment, the control portion 40 controls the exposure device 3 so as to perform the exposing operation while an image forming area of the surface of the photosensitive member 1 in the rotational direction of the photosensitive member 1 passes through the exposing portion Pb where the surface of the photosensitive member 1 is exposed. In addition, in the present Embodiment, while the image forming area passes through the exposing portion Pb, the control portion 40 controls the exposure device 3 so as to expose the surface of the photosensitive member 1 in the paper passing area D by a first exposure amount and to form the electrostatic image on the surface of the photosensitive member 1, and so as to perform the exposing operation in the non-transfer area E by a second exposure amount smaller than the first exposure amount.

As explained above, according to the present Embodiment, it becomes possible to suppress the rise of the surface potential in the non-transfer area E of the photosensitive drum 1. Thus, according to the present Embodiment, it is possible to suppress the excessive rise of the surface potential in the end portion (non-transfer area E) of the photosensitive drum 1 in the longitudinal direction in a configuration where a contact area C of the surface of the photosensitive drum 1 in contact with the transfer roller 5 is shorter than a contact area B of the surface of the photosensitive drum 1 in contact with the charging roller 2 in the longitudinal direction. Therefore, as described above, it is possible to suppress an occurrence of damage to the surface of the photosensitive drum 1 due to the electric discharge caused by the rise of the surface potential in the non-transfer area E of the photosensitive drum 1, etc.

Next, another Embodiment of the present invention will be described. The basic configuration and operation of the image forming apparatus of the present Embodiment are the same as those of the Embodiment 1. Therefore, in the image forming apparatus of the present Embodiment, with respect to elements having functions or configurations that are the same as or corresponding to the image forming apparatus of the Embodiment 1 will be labeled with the same reference numerals as the Embodiment 1, and detailed explanations will be omitted.

In the present Embodiment, a case where the transfer area C is shorter than a developing area G described below in the longitudinal direction will be described for an object of downsizing the image forming apparatus 100, etc.

Figure 6:
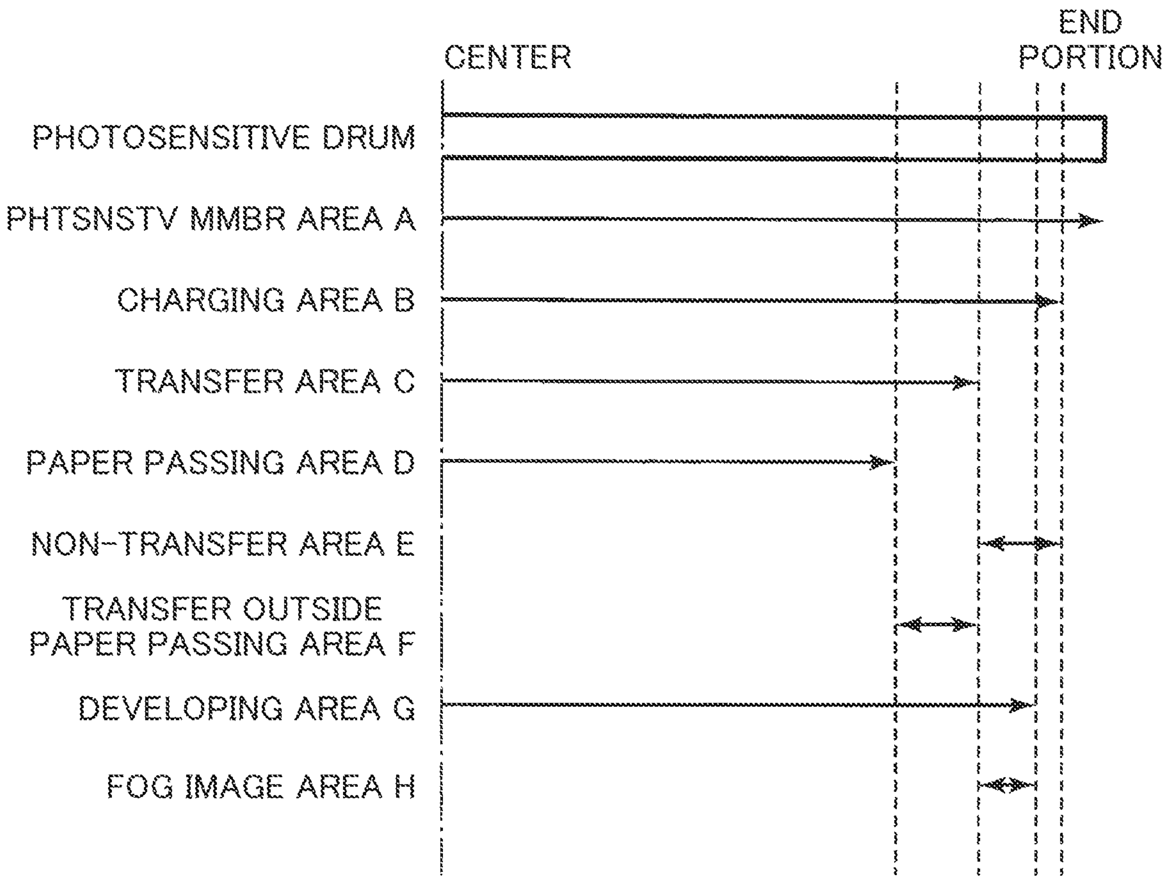
FIG. 6 is a schematic view illustrating positional relationships among each portion around a photosensitive drum with respect to the longitudinal direction according to an Embodiment 2.

FIG. 6 is a schematic view illustrating positional relationships among each portion around the photosensitive drum 1 with respect to the longitudinal direction according to the present Embodiment. Although the positional relationships may vary depending on the size (in particular, the width in the direction substantially perpendicular to the conveyance direction) of the recording material P used for the image formation, FIG. 6 illustrates positional relationships in a case where the size of the recording material P is the LTR size.

In FIG. 6, the "photosensitive member area A", the "charging area B", the "transfer area C", the "paper passing area D", the "non-transfer area E", and the "transfer outside paper passing area F" represent the same areas or the width of the same areas as described in the Embodiment 1, respectively. The "developing area (developing portion) G" represents an area of the developing roller 4*a* with respect to the longitudinal direction or a width of the area coated by the toner (toner coated area) (more specifically, an area or a width of the area on the developing roller 4*a* that is coated by the toner and that can contact the surface of the photosensitive drum 1). In the present Embodiment, the developing area G can also be referred to as an area or a width of the area where an opening for supplying the toner, which is the developer in the developing device 4, to the developing roller 4*a* is disposed on the developing container 4*b*. In other words, in the present Embodiment, the toner is supplied to the developing roller 4*a* in the area where the opening is disposed. In addition, a "fogging area H" represents an area with respect to the longitudinal direction or a width of the area in the non-transfer area E and in the developing area G. Incidentally, for convenience sake, areas on the photosensitive drum 1 corresponding to the "charging area B", the "transfer area C", the "paper passing area D", the "non-transfer area E", the "transfer outside paper passing area F", the "developing area G", and the "fogging area H" described above are also referred to as the "charging area B", the "transfer area C", the "paper passing area D", the "non-transfer area E", the "transfer outside paper passing area F", the "developing area G", and the "fogging area H", respectively. In addition, in the present Embodiment, the photosensitive member area A, the charging area B, the transfer area C, the paper passing area D, and the developing area G are disposed with the center reference as described in the Embodiment 1, respectively. Incidentally, in FIG. 6, a range from the center to one side of the end portion with respect to the longitudinal direction is illustrated.

In the present Embodiment, at least a part of the developing area G overlaps with the non-transfer area E with respect to the longitudinal direction. In other words, in the present Embodiment, the developing area G is shorter than the charging area B and longer than the transfer area C with respect to the longitudinal direction. Incidentally, an area in the developing area G that overlaps with the non-transfer area E is the above fogging area H. In other words, the fogging area H corresponds to a part of the non-transfer area E.

In the present Embodiment, the developing roller 4*a* contacts the photosensitive drum 1. Therefore, a "fogging", in which the toner adheres to the photosensitive drum 1 in the developing area G, may occur. In particular, if the surface potential in the non-transfer area E of the photosensitive drum 1 rises, the "fogging" ("reverse fogging") caused by a "reverse toner" charged with the reverse polarity to the normal charging polarity may worsen. In other words, the "reverse fogging" may occur in the fogging area H due to the "reverse toner". In a case where an amount of the "fogging" is large and the "fogging" continues for a long period of time, the cleaning blade 6*a* of the cleaning device 6 may become unable to remove the toner completely, resulting in a cleaning defect. Then, due to the cleaning defect, an "end portion stain" may occur, in which the end portion of the recording material P with respect to the direction substantially perpendicular to the conveyance direction of the recording material P is stained by the toner.

Figure 7:
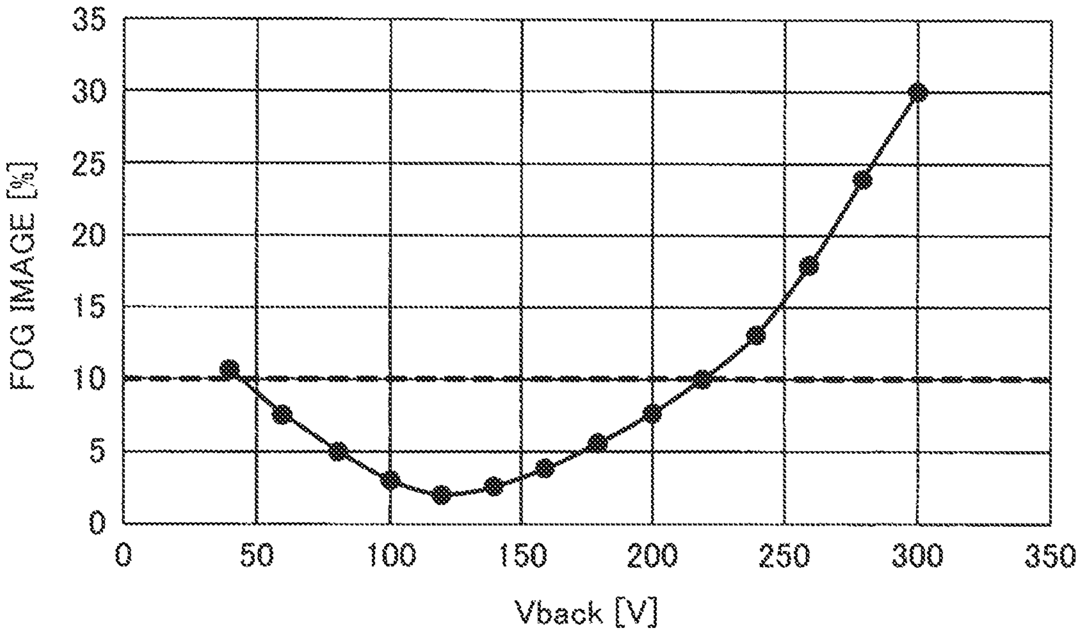
FIG. 7 is a graph illustrating a relationship between Vback and a degree of a “fogging”.

Here, the "fogging" will be further described. FIG. 7 is a graph illustrating a relationship between Vback, which is a potential difference between the dark portion potential (surface potential of a non-exposure portion) of the photosensitive drum 1 and a potential of the developing roller 4*a* (potential of the developing voltage), and a degree of the "fogging". Incidentally, Vback takes a positive value in a case where the dark portion potential of photosensitive drum 1 is larger than the potential of developing roller 4*a* on the same polarity side as the normal charging polarity of the toner. A measurement of the "fogging" on the photosensitive drum 1 was performed as follows. The toner was collected by sticking an adhesive surface of a transparent adhesive tape onto the photosensitive drum 1. Then, the adhesive tape was attached to a piece of paper, and a density (fog density (%)) of the adhesive tape on which the toner adhered was measured to quantify the "fogging". In a case where no "fogging" occurs, the fog density is 0%, and the larger a value of the fog density, the greater a degree of the "fogging", which indicates that more toner is adhering to the surface of the photosensitive drum 1. Types of the fogging include the following. First, in a "ground fogging", the toner charged with the normal charging polarity adheres to the surface of the photosensitive drum 1 in a case where the potential difference between the dark portion potential of the photosensitive drum 1 and the developing roller 4*a* becomes small. Next, in the "reverse fogging", the "reverse toner" charged with the reverse polarity to the normal charging polarity adheres to the surface potential of the photosensitive drum 1 in a case where the potential difference between the dark portion potential of photosensitive drum 1 and the developing roller 4*a* becomes large.

As described above, the state 1-6 of FIG. 3B shows a state in which the potential difference between the transfer outside paper passing area F and the non-transfer area E becomes large. VbackE1, which is a potential difference between the surface potential in the non-transfer area E of the photosensitive drum 1 and the potential of the developing roller 4*a*, is larger than VbackF1, which is a potential difference between the surface potential in the transfer outside paper passing area F of the photosensitive drum 1 and the potential of the developing roller 4*a*. In a case where Vback becomes large as described above, the "reverse fogging" may occur, in which the "reverse toner" adheres to the surface of the photosensitive drum 1. As shown in FIG. 7, in a configuration of the present Embodiment, the degree of the fogging becomes the smallest when Vback is around 120 V, and the fog density becomes 2%. This degree of the fogging is difficult to see on the recording material P and does not cause a problem. On the other hand, when Vback becomes larger than 220 V, the degree of the fogging (reverse fogging) becomes more significant, and in a case where the fog density continues to exceed 10%, the cleaning defect may occur.

The surface potential in the fogging area H of the photosensitive drum 1 and the degree of the fogging (reverse fogging) in the present Embodiment and in a Comparative Example 2 will be described using FIGS. 3A, FIG. 3B, FIG. 4A, FIG. 4B and FIG. 5. In the present Embodiment, the same exposing operation as in the Embodiment 1 described using FIG. 4A and FIG. 4B was performed, and in the Comparative Example 2, the same exposing operation described using FIG. 3A and FIG. 3B was performed. A configuration and an operation of the image forming apparatus 100 of the Comparative Example 2 are substantially the same as those of the image forming apparatus 100 of the present Embodiment except the above point. FIG. 5 shows transitions of the surface potential in the non-transfer area E of the photosensitive drum 1 after exposure and before transfer when the continuous image formations were performed on 20 sheets of the LTR size as the recording material P. In FIG. 5, the solid line shows a transition of the surface potential in a case where the exposing operation of the present Embodiment is performed and the dashed line shows a transition of the surface potential in a case where the exposing operation of the Comparative Example 2 is performed. The transitions of the surface potential in the non-transfer area E of the photosensitive drum 1 with respect to the Embodiment 2 and the Comparative Example 2 is the same as the transitions of the surface potential in the non-transfer area E of the photosensitive drum 1 with respect to the Embodiment 1 and the Comparative Example 1, respectively. As mentioned above, the fogging area H corresponds to the part of the non-transfer area E.

As shown in FIG. 3B (state 1-6) and FIG. 5, in the Comparative Example 2. the surface potential in the fogging area H of the photosensitive drum 1 is −700 V. Therefore, as shown in FIG. 3B (state 1-6), the VbackE1 of the non-transfer area E, which includes the fogging area H, is 320 V. According to FIG. 7, since when Vback is 320 V, the fog density exceeds 20%, the cleaning defect due to the fogging (reverse fogging) may occur. On the other hand, as shown in FIG. 4B (state 2-6) and FIG. 5, in the present Embodiment, the surface potential in the fogging area H of the photosensitive drum 1 is −490 V. In addition, as shown in FIG. 4B (state 2-6), the VbackE2 of the non-transfer area E, which includes the fogging area H, is 110 V. According to FIG. 7, when Vback is 110 V, the fog density is about 3% and is not a problematic degree with respect to the cleaning defect.

Thus, in the configuration where the transfer area C is shorter than the developing area G with respect to the longitudinal direction, it is possible to suppress the occurrence of the cleaning defect by performing the same exposing operation exposing the non-transfer area E as in the Embodiment 1.

Incidentally, in order to further suppress the occurrence of the cleaning defect, it is preferable to equalize the fog density of the fogging occurring in the transfer outside paper passing area F and the fogging area Has much as possible. Ina case were there is a density step of the fog density, a minute torque difference with respect to the longitudinal direction of the cleaning blade 6*a* is generated at a point of the density step, and the cleaning defect becomes likely to occur. In the state 2-6 of FIG. 4B, VbackE2 of the non-transfer area E, which includes the fogging area H, is 110 V, while VbackF2 of the transfer outside paper passing area F is 120 V. According to FIG. 7, when Vback is 110 V, the fog density is about 3%, while when Vback is 120 V, the fog density is about 2%. Thus, there is a slight difference in the fog density in the non-transfer area E and the transfer outside paper passing area F in the state 2-6 of FIG. 4B. In view of suppressing the occurrences of the cleaning defect, it is preferable to expose the transfer outside paper passing area F in addition to the non-transfer area E, and to equalize the surface potential in the non-transfer area E and in the transfer outside paper passing area F of the photosensitive drum 1 after the exposure. Here, equalizing the surface potential in the non-transfer area E and in the transfer outside paper passing area F of the photosensitive drum 1 (making substantially the same) should sufficiently equalize to sufficiently suppress the density step of the fog density in view of suppressing the occurrences of the cleaning defect. Although not limited to this, typically, a difference of the surface potential should be equal to or less than 5 V, preferably equal to or less than 3 V, more preferably equal to or less than 1 V (0 V may be possible).

Thus, in the present Embodiment, in the image forming apparatus 100, in the rotational axial direction of the charging member 2, the width of the transfer portion Nt is shorter than the width of the charging portion B, the end portion of the surface of the photosensitive member 1 in the rotational axial direction includes the non-transfer area E in contact with the charging member 2 and in no contact with the transfer member 5, and at least a part of the toner coated area of the developing member 4*a* overlaps with the non-transfer area E in the rotational axis direction. In the present Embodiment, the control portion 40 is capable of performing the exposing operation such that the exposure device 3 exposes at least the non-transfer area E of the photosensitive member 1 or at least the non-transfer area E of the photosensitive member 1 and the transfer outside paper passing area F during the rotation of the photosensitive member 1.

As described above, in a configuration where the transfer area C is shorter than the developing area G with respect to the longitudinal direction, the occurrence of the cleaning defect can be suppressed by performing the exposing operation that exposes the non-transfer area E and even the transfer outside paper passing area F.

Next, another Embodiment of the present invention will be described. The basic configuration and operation of the image forming apparatus of the present Embodiment are the same as those of the Embodiment 1. Therefore, in the image forming apparatus of the present Embodiment, with respect to elements having functions or configurations that are the same as or corresponding to the image forming apparatus of the Embodiment 1 will be labeled with the same reference numerals as the Embodiment 1, and detailed explanations will be omitted.

As explained in the Embodiment 1, upon exposing the non-transfer area E, in a case where the transfer outside paper passing area F is narrow and the exposure amount to the non-transfer area E is large, the toner may adhere near the end portion of the photosensitive drum 1 with respect to the longitudinal direction. Or, as described in the Embodiment 2, upon exposing the non-transfer area E and the transfer outside paper passing area F, in a case where the exposure amount to the transfer outside paper passing area F is large, the toner may adhere near the end portion of the photosensitive drum 1 with respect to the longitudinal direction, as described above. In such cases, if a conveyance position of the recording material P with respect to a direction substantially perpendicular to the conveyance direction of the recording material P is shifted, the toner is transferred from the photosensitive drum 1 to the end portion of the recording material P with respect to the direction substantially perpendicular to the conveyance direction of the recording material P, and the “end portion stain”, in which the end portion of the recording material P is stained, may occur. On the other hand, in order to perform the weak exposure to an extent that no toner adheres to the non-transfer area E or the transfer outside paper passing area F, it may be necessary to add a dedicated weak exposure light source or an electrical board for adjusting the exposure amount, which may lead to an increase in the size of the apparatus. Therefore, in the present Embodiment, the exposing operation that enables a wider available range of the exposure amount for exposing the non-transfer area E and even the transfer outside paper passing area F, while reducing a risk of the occurrence of the end portion stain of the recording material P will be described.

Since an image forming apparatus 100 of the present Embodiment is not provided with the weak exposure light source used in the image forming apparatus 100 of the Embodiment 1 and the Embodiment 2, it becomes possible to downsize the apparatus. Incidentally, as in the Embodiment 2, the image forming apparatus 100 of the present Embodiment is configured so that the transfer area C is shorter than the developing area G with respect to the longitudinal direction.

And in the present Embodiment, the exposing operation to expose the non-transfer area E and even the transfer outside paper passing area F, as in the Embodiment 1 or the Embodiment 2, is performed in a non-image formation time under the continuous image formation in which a drive of the photosensitive drum 1 does not stop and images are formed onto the multiple sheets of the recording material P. In particular, in the present Embodiment, the exposing operation to expose the non-transfer area E is performed in the non-image formation time under the continuous image formation.

That is, it becomes possible to reduce the risk of the end portion stain, which occurs as the toner adheres to the non-transfer area E and the transfer outside paper passing area F and then the adhered toner is transferred to the recording material P, by not performing the exposing operation to expose the non-transfer area E and the transfer outside paper passing area F during the image forming time.

In addition, by reducing the risk of the end portion stain of the recording material P, the available range of the exposure amount for exposing the non-transfer area E and the transfer outside paper passing area F is widened. For example, when an object is to suppress the rise of the surface potential of the photosensitive drum 1, it becomes possible to use the same strong exposure amount for the non-transfer area E and the transfer outside paper passing area F as the exposure amount for the image portion.

A transition of the surface potential in the non-transfer area E of the photosensitive drum 1 in the present Embodiment will be described using FIG. 8A and FIG. 8B. Incidentally, the leading end and the trailing end of the recording material P mean the leading end and the trailing end with respect to the conveyance direction of the recording material P, even when not specified.

Figure 8A:
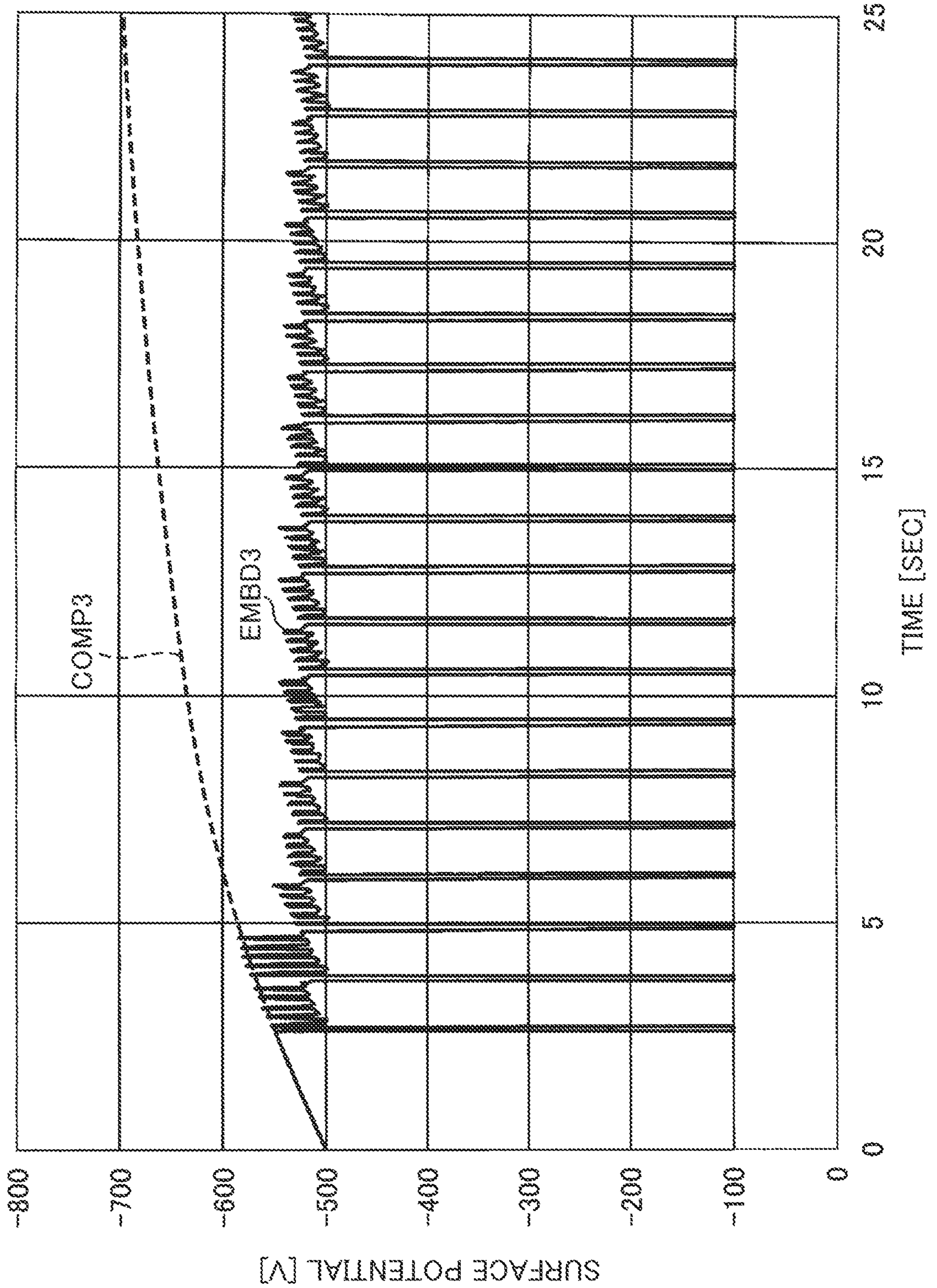
FIG. 8A is a graph illustrating transitions of the surface potential in an end portion of the photosensitive drum according to an Embodiment 3 and a Comparative Example 3.

FIG. 8A illustrates a transition of the surface potential in the non-transfer area E of the photosensitive drum 1 after exposure and before transfer when the continuous image formations were performed on 20 sheets of the LTR size as the recording material P with a paper (sheet) interval distance (distance with respect to the rotational direction of the photosensitive drum 1 between a position of the photosensitive drum 1 corresponding to the trailing end of a preceding recording material P and a position of the photosensitive drum 1 corresponding to the leading end of the subsequent recording material P) of 45 mm. In FIG. 8A, a solid line shows a transition of the surface potential in a case where the exposing operation of the present Embodiment is performed and a dashed line shows a transition of the surface potential in a case where the exposing operation of the Comparative Example 3 is performed. In the present Embodiment, only in a part of the pre-rotation process, which is a non-image formation time, and in the sheet interval process, which is a non-image formation time, the exposing operation was performed by the exposure device 3 to expose the non-transfer area E with an exposure amount of 0.3 $\mu J/cm^2$, which is the same exposure amount as the exposure amount for the image portion. In the Comparative Example 3, the exposing operation described using FIG. 3A and FIG. 3B was performed. A configuration and an operation of the image forming apparatus 100 of the Comparative Example 3 are substantially the same as those of the image forming apparatus 100 of the present Embodiment except the above point. The transition of the surface potential in the Comparative Example 3 is the same as shown in FIG. 5.

Figure 8B:
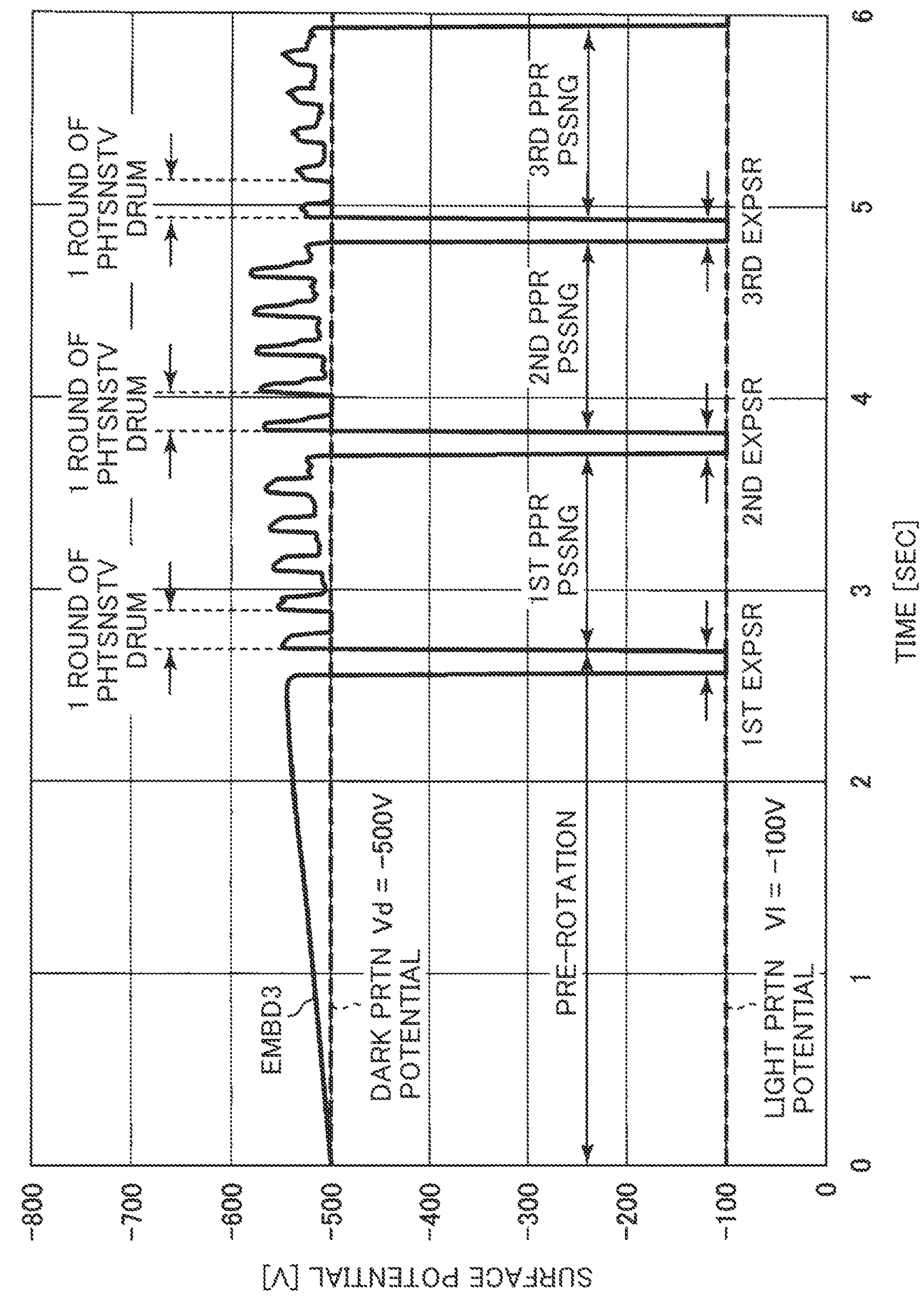
FIG. 8B is a graph illustrating a transition of the surface potential in the end portion of the photosensitive drum according to the Embodiment 3.

FIG. 8B plots only the transition of the surface potential in the case where the exposing operation of the present Embodiment is performed with changing a time range of a horizontal axis of FIG. 8A. Details of the exposing operation in the present Embodiment will be described using FIG. 8B.

First, the surface potential of the photosensitive drum 1 immediately after the start of a drive (print operation, pre-rotation process) of the photosensitive drum 1 is maintained at the dark portion potential Vd of −500 V by the charging roller 2. The surface potential in the non-transfer area E of the photosensitive drum 1 gradually rises due to a rotational drive in the pre-rotation process before a paper passes. Then, just before a first sheet of the recording material P passes, the exposing operation to expose the non-transfer area E by the exposure device 3 over a distance of 45 mm, which is the same distance as the paper interval distance, with respect to the rotational direction of the photosensitive drum 1 is performed. In the present Embodiment, since the non-transfer area E is exposed with the same exposure amount as the exposure amount for the image portion, the surface potential of the photosensitive drum 1 drops to the light portion potential Vl of −100 V by a first exposing operation. After a completion of the first exposing operation, the first sheet of the recording material P passes.

Here, with the configuration of the present Embodiment, since the distance with respect to the rotational direction of the photosensitive drum 1 which is exposed by the first exposing operation is shorter than a circumferential length of the photosensitive drum 1 (approximately 75.4 mm), an entire circumference of the photosensitive drum 1 cannot be exposed by one exposing operation. In other words, there will be an exposed area and a non-exposed area in the non-transfer area E in a circumferential direction of the photosensitive drum 1 while the paper is passing during which the non-transfer area E is not exposed. Therefore, with respect to the surface potential in the non-transfer area E of the photosensitive drum 1 while the first sheet of the recording material P is passing, the surface potential of the area exposed in the immediately previous non-image formation time is recharged by the charging roller 2, returns to the dark portion potential Vd of −500 V, and then further begins to rise again due to the injection charging. On the other hand, the surface potential of the area not exposed in the immediately previous non-image formation time continues to rise with following the same transition as a transition of the surface potential of the photosensitive drum 1 at a time of a beginning of the pre-rotation process (before exposure of the non-transfer area E). Therefore, the surface potential in the non-transfer area E of the photosensitive drum 1 after the first exposing operation rises and falls in a range about from −500 V to −560 V in a rotation cycle of the photosensitive drum 1.

In the sheet interval process after the first sheet of the recording material P passed, the same exposing operation as in the pre-rotation process is performed (second exposing operation). That is, in the sheet interval process after the first sheet of the recording material P passed, the exposing operation to expose the non-transfer area E by the exposure device 3 over the distance of 45 mm, which is the same distance as the paper interval distance, with respect to the rotational direction of the photosensitive drum 1 is performed. There is still an area which is not exposed by the first exposing operation and the second exposing operation in the non-transfer area E in the circumference of the photosensitive drum 1 while a second sheet of the recording material P is passing after the second exposing operation. Therefore, the surface potential in the non-transfer area E of the photosensitive drum 1 rises and falls, and a range of the rise and fall is about from −500 V to −580 V, which is wider than when the first sheet of recording material P is passing. In the sheet interval process after the second sheet of the recording material P passed, the exposing operation is performed in the same manner (third exposing operation). It is highly likely that there will be no area in the non-transfer area E in the circumference of the photosensitive drum 1 which is not exposed by any one of the first through the third exposing operation while a third sheet of the recording material P is passing after the third exposure. In the present Embodiment, there is no area in the circumference of the photosensitive drum 1 which is not exposed by any one of the first through the third exposing operation while the third sheet of the recording material P is passing after the third exposure. Therefore, the range of the rise and fall of the surface potential in the non-transfer area E of the photosensitive drum 1 in the rotation cycle of the photosensitive drum 1 is narrowed to a range about from −500 V to −540 V.

As shown in FIG. 8A, in the present Embodiment, the surface potential in the non-transfer area E of the photosensitive drum 1 transitions stably between −500 V and −540 V even after a number of the exposing operations as described above exceeds three times. Thus, according to the present Embodiment, it is possible to suppress the rise of the surface potential in the non-transfer area E of the photosensitive drum 1, as in the Comparative Example 3. In addition, according to the present Embodiment, it is possible to suppress the risk of the occurrence of the end portion stain of the recording material P while suppressing the increase in the size of the apparatus due to an addition of the weak exposure light source, etc.

On the other hand, in the present Embodiment, since the non-transfer area E is exposed by the exposure amount of 0.3 μJ/cm2, which is the same exposure amount for the image portion, the surface potential in the non-transfer area E of the photosensitive drum 1 becomes the light portion potential Vl of −100 V after exposure, as described above. Therefore, the toner adheres to the non-transfer area E after the exposure. However, the toner adhered to the non-transfer area E only in a part of the pre-rotation process and in the sheet interval process is conveyed to the cleaning blade 6*a*, which is different from a situation described in the Embodiment 2, where the fogging toner is continuously conveyed to the cleaning blade 6*a*. Therefore, it is possible to suppress the occurrence of the cleaning defect as described in the Embodiment 2.

Figure 9:
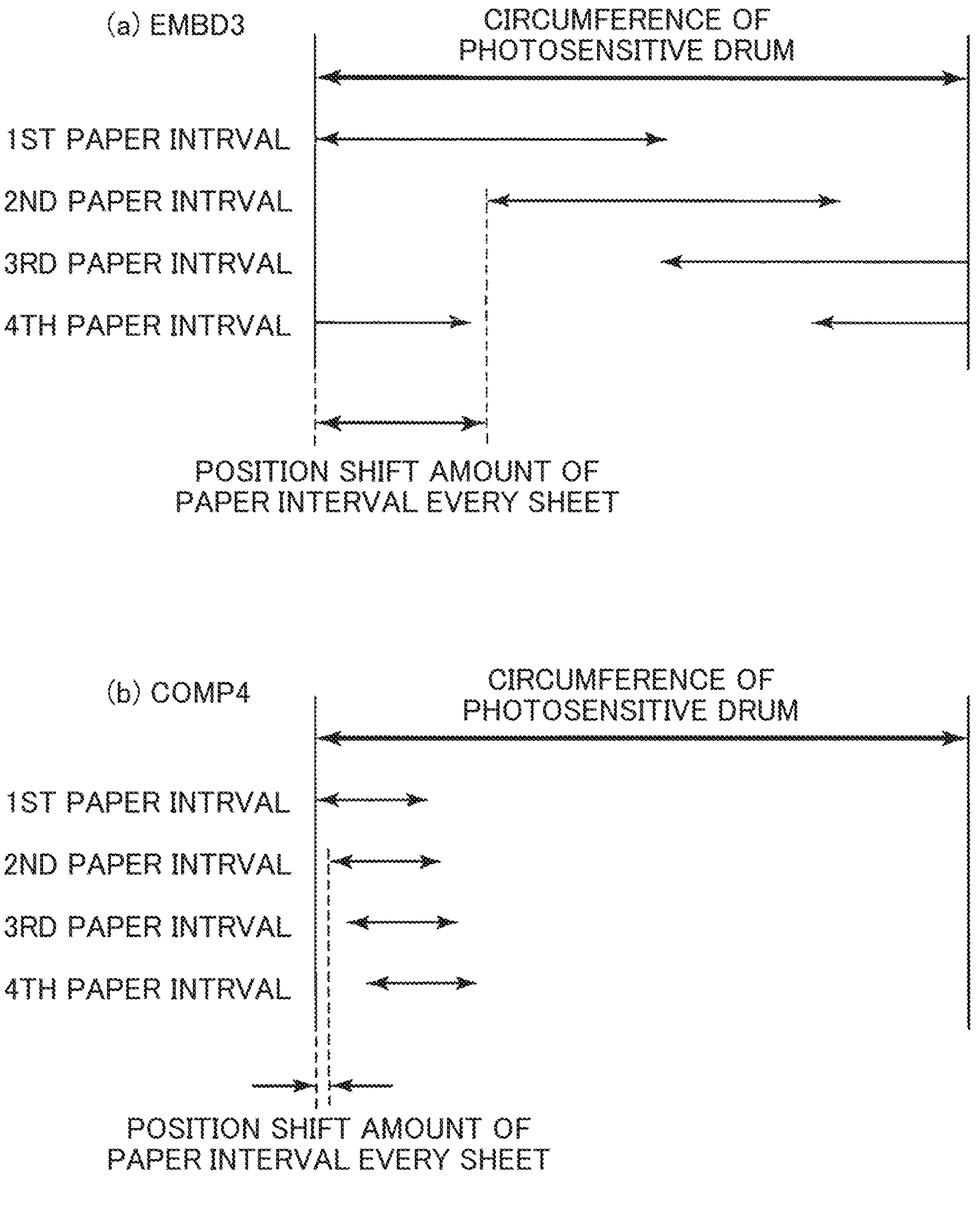
FIG. 9, part (a) and part (b), is an explanatory view of paper interval positions with respect to a circumferential direction of the photosensitive drum.

Next, in a case where the exposing operation in the sheet interval process as described above is performed, an optimum paper interval distance depending on a length of the recording material P with respect to the conveyance direction will be described. FIG. 9, part (a) and part (b), shows where paper interval positions (section with respect to the rotational direction of the photosensitive drum 1 between the position of the photosensitive drum 1 corresponding to the leading end of the preceding recording material P and the position of the photosensitive drum 1 corresponding to the leading end of the subsequent recording material P) are positioned in the circumferential length of the photosensitive drum 1 when a position with respect to the circumferential length of the photosensitive drum 1 is represented in linear form. Incidentally, in the present Embodiment, although the exposing operation to suppress the rise of the surface potential of the photosensitive drum 1 is always performed over an entire period of the sheet interval process, the exposing operation may be performed only in a part of the sheet interval process, for example.

Part (a) of FIG. 9 illustrates the paper interval positions (i.e., positions where the exposing operation to suppress the rise of the surface potential of the photosensitive drum 1 are performed), in the present Embodiment, with respect to the circumferential length of the photosensitive drum 1 in a case where sheets of the LTR size as the recording material P are passed with the paper interval distance of 45 mm, as in FIG. 8. It can be seen that the circumferential length of the photosensitive drum 1 can be exposed through the first to the third sheet interval process. It is consistent with a fact that, in FIG. 8, the surface potential of the photosensitive drum 1 begins to transition stably when a number of the exposing operations in the paper interval process exceeds three times (the first exposing operation is an exposing operation in a section corresponding to the sheet interval distance in a part of the pre-rotation process). On the other hand, part (b) of FIG. 9 illustrates the paper interval positions with respect to the circumferential length of photosensitive drum 1 in the Comparative Example 4. In the Comparative Example 4, sheets of the LTR size as the recording material P are passed with the paper interval distance of 25 mm. A configuration and an operation of the image forming apparatus 100 of the Comparative Example 4 are substantially the same as those of the image forming apparatus 100 of the present Embodiment except the above point. In a case of the Comparative Example 4, a shifting amount of the paper interval position per sheet (paper interval position shifting amount) is small, and the paper interval positions appear almost the same position on the photosensitive drum 1 every time. In such a case, it becomes difficult to suppress the rise of the surface potential of the photosensitive drum 1 over the entire circumferential length of photosensitive drum 1 only by the exposing operation in the sheet interval processes. The paper interval position shifting amount per sheet is expressed as the following equation (1).

$$\text{Paper interval position shifting amount per sheet} = (\text{the length with respect to the conveyance direction of the recording material} + \text{paper interval distance}) - n \times \text{the circumferential length of the photosensitive drum} \quad (1)$$

Here, n is an arbitrary integer (a positive integer equal to or greater than 1), and a value which makes the smallest absolute value of the equation (1) will be chosen. The smaller the paper interval position shifting amount per sheet is, the more difficult it is likely to be to suppress the rise of the surface potential of the photosensitive drum 1 by the exposing operation in the sheet interval process as in the Comparative Example 4 of part (b) of FIG. 9. In other words, it is preferable for the paper interval distance to be set such that a sum of the length of the recording material P with respect to the conveyance direction of the recording material P and the paper interval distance becomes other than approximately integer times of a circumferential length of the photosensitive drum 1. For example, in order to avoid the transition of the rise of surface potential as in the Comparative Example 3 of FIG. 8, it is preferable to satisfy a relationship of the following equation (2).

$$|\text{The circumferential length of the photosensitive drum} \div \text{the paper interval position shifting amount per sheet}| \leq \text{a number of pages allowed for the potential rise} \quad (2)$$

An absolute value of "the circumferential length of the photosensitive drum the paper interval position shifting amount per sheet" in the above formula (2) represents a number of exposing operations required to expose the entire circumferential length of photosensitive drum 1 by the exposing operation in the sheet interval process. In addition, the "number of pages allowed for the potential rise" in the above formula (2) represents an upper limit value of a number of sheets (number of paper passings, number of pages) within which images can be formed continuously while sufficiently suppressing defects caused by the rise of the surface potential as described in the Embodiment 1 and the Embodiment 2 under a condition where there is no means to counteract the rise of the surface potential in the non-transfer area E on the photosensitive drum 1 as in the Comparative Example 3 of FIG. 8. For example, if the surface potential reaches −700 V after 20 sheets passed as in the Comparative Example 3 of FIG. 8, there is a risk of the cleaning defect caused by the "fogging" as described in the Embodiment 2. Therefore, in order to suppress the rise of the surface potential of the photosensitive drum 1 before such a situation arises, the number of pages allowed for the potential rise should be set to 19 (less than 20). Here, although not limited to this, the number of exposing operations required to expose the entire circumferential length of the photosensitive drum 1 by the exposing operation in the sheet interval process (the left side of the above equation (2)) should be around from 1 to 10 times, and preferably around from 1 to 5 times (in the present Embodiment, it is 3 times).

Thus, in a case where the exposing operation in the sheet interval process is performed, it is desirable to set the sum of the length of the recording material P with respect to the conveyance direction of the recording material P and the paper interval distance so as to become other than approximately integer times of the circumferential length of the photosensitive drum 1. By this, it becomes possible to suppress the rise of the surface potential of the photosensitive drum 1 over the entire circumferential length of the photosensitive drum 1.

Incidentally, the exposing operation in the above sheet interval process can be performed in the section in the part of the pre-rotation process corresponding to the sheet interval distance as shown in FIG. 8B, other than the sheet interval process. In addition, as described above, the exposing operation may be performed only in a part of the paper interval distance, and in this case, the above equations (1) and (2) may be applied by replacing the above paper interval position with a section where the exposing operation is performed in the paper interval position.

In addition, in the present Embodiment, the non-transfer area E is exposed in the exposing operation in the sheet interval process; however, the transfer outside paper passing area F may be further exposed as described above. In addition, in view of a toner consumption, etc., it can be said that it is preferable to expose only the non-transfer area E or only the non-transfer area E and the outside paper passing area F as described above; however, if desired, an entire area with respect to the longitudinal direction of the photosensitive drum 1 (an entire area of the photosensitive member area A or the charging area B) may be exposed.

Thus, in the present Embodiment, the control portion 40 controls the exposure device 3 so as to perform the exposing operation while the non-image forming area of the surface of the photosensitive member 1 in the rotational direction of the photosensitive member 1 passes through the exposing portion Pb where the surface of the photosensitive member 1 is exposed. In addition, in the present Embodiment, the control portion 40 controls the exposure device 3 so as to expose the surface of the photosensitive member 1 in the paper passing area D in the rotational axis direction of the charging member 2 by a first exposure amount and to form the electrostatic image on the surface of the photosensitive member 1 while the image forming area of the surface of the photosensitive member 1 in the rotational direction of the photosensitive member 1 passes through the exposing portion Pb, and so as to perform the exposing operation by substantially the same exposure amount of the first exposure amount while the non-image forming area passes through the exposing portion Pb. In the present Embodiment, during the continuous image formation for transferring the toner image onto a plurality of the recording materials P, the non-image forming area is the section between the position of the photosensitive member 1 corresponding to the trailing end of a preceding recording material P and the position of the photosensitive member 1 corresponding to the leading end of a subsequent recording material P. In addition, in the present Embodiment, the length of the section is set such that the sum of the length of the recording material P with respect to the conveyance direction of the recording material P and the length of the section with respect to the rotational direction of the photosensitive member 1 becomes other than approximately integer times of the circumferential length of the photosensitive member 1. Incidentally, it is not limited to performing the above exposing operation in all of the sheet interval processes during the continuous image formation. The exposing operation may only be required to suppress the rise of the surface potential of the photosensitive drum 1 in the non-transfer area E. For example, the above exposing operation may be performed in the sheet interval process after a predetermined number of sheets of the recording material P are passed, or the exposing operation in the sheet interval process may be performed after images are formed on a predetermined number of sheets of the recording material P.

As explained above, according to the present Embodiment, it is possible to widen the available range of the exposure amount for exposing the non-transfer area E and even the transfer outside paper passing area F, while reducing the risk of the occurrence of the end portion stain of the recording material P.

The present invention was described above according to the specific Embodiments; however, the present invention is not limited the above Embodiments.

In the above Embodiments, cases where the transfer member is the transfer roller were described, however, the transfer member is not limited to the transfer roller. The transfer member may be configured to include, for example, a rotatable endless belt in contact with the photosensitive member. On an inner circumferential surface side of the transfer belt, a voltage applying member (roller, brush, sheet, etc.) that supplies the transfer voltage to the transfer portion via the transfer belt may be provided at a position opposite to the photosensitive member. In addition, the transfer member is not limited to a rotating member, but may be a member of other shapes such as a pad-shaped member, a sheet-shaped (film-shaped) member, or a fixed-brush-shaped member.

In addition, in the above Embodiments, cases where the photosensitive member is the photosensitive drum were described, however, the photosensitive member is not limited to the photosensitive drum. The photosensitive member may be a photosensitive belt configured in a form of an endless belt.

In addition, in the above Embodiments, the pre-exposure means was not disposed in the image forming apparatus. As mentioned above, the phenomenon in which the surface potential in the non-transfer area of the end portion in the longitudinal direction of the photosensitive member rises to an excessive potential tends to be more significant when the image forming apparatus employs the pre-exposureless method. Therefore, it can be said that the present invention is particularly effective when the image forming apparatus employs the pre-exposureless method. However, the present invention is not limited to such a configuration. The present invention can also be applied to the image forming apparatus provided with the pre-exposure means. In this case, by applying the present invention, an effect of reducing a discharge amount in a charging process by reducing the exposure amount of the pre-exposure means can be obtained as well as the effects described in the above Embodiments.

Similarly, it can be said that the present invention is particularly effective in a case where a DC charging method is employed, however, the present invention can also be applied in a case where an AC/DC charging method is employed.

In addition, the present invention is not limited to an application to the configuration in which the transfer area is shorter than the developing area in the longitudinal direction. The present invention can also be applied to a configuration in which the length of the transfer area is longer than the length of the developing area in the longitudinal direction, and effects such as suppressing damage to the photosensitive member as described above can be obtained.

According to the present invention, in the configuration in which the contact area of the surface of the photosensitive member in contact with the transfer member is shorter than the contact area of the surface of the photosensitive member in contact with the charging member with respect to the longitudinal direction, it is possible to suppress the excessive rise of the surface potential of the end portion in the longitudinal direction of the photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-112088, filed Jul. 12, 2022, which is hereby incorporated by reference herein in its entirety.

What is claimed is:

1. An image forming apparatus comprising:

a rotatable photosensitive member;

a rotatable charging member configured to form a charging portion in contact with the photosensitive member and to charge a surface of the photosensitive member at the charging portion;

an exposure unit configured to expose the surface of the photosensitive member charged by the charging member and to form an electrostatic image on the surface of the photosensitive member;

a developing member configured to supply toner to the electrostatic image formed on the surface of the photosensitive member and to form a toner image;

a transfer member configured to form a transfer portion in contact with the surface of the photosensitive member and to transfer the toner image to a recording material from the surface of the photosensitive member at the transfer portion by application of a voltage; and a control portion configured to control the exposure unit, wherein in a rotational axis direction of the charging member, a width of the transfer portion is shorter than a width of the charging portion, and an end portion of the surface of the photosensitive member in the rotational axis direction includes a non-transfer area in contact with the charging member and not in contact with the transfer member, wherein in the rotational axis direction, an area in contact with the recording material at the transfer portion of the surface of the photosensitive member is defined as a paper passing area and an area outside of the paper passing area and inside of the transfer portion is defined as a transfer outside paper passing area, and wherein the control portion is capable of performing an exposing operation such that the exposure unit exposes at least the non-transfer area of the photosensitive member during rotation of the photosensitive member, controls the exposure unit to form a surface potential on the surface of the photosensitive member downstream of an exposing portion where the surface of the photosensitive member is exposed by the exposing operation and upstream of the transfer portion with respect to a rotational direction of the photosensitive member, and controls the exposure unit such that an absolute value of the surface potential formed on the non-transfer area is lower than an absolute value of the surface potential formed on the transfer outside paper passing area downstream of the exposing portion and upstream of the transfer portion with respect to the rotational direction of the photosensitive member.

2. An image forming apparatus according to claim 1, wherein the control portion controls the exposure unit so as to expose at least the non-transfer area of the photosensitive member and the transfer outside paper passing area in the exposing operation.

3. An image forming apparatus according to claim 1, wherein the control portion controls the exposure unit so as to perform the exposing operation while an image forming area of the surface of the photosensitive member in the rotational direction of the photosensitive member passes through the exposing portion where the surface of the photosensitive member is exposed.

4. An image forming apparatus according to claim 3, wherein while the image forming area passes through the exposing portion, the control portion controls the exposure unit so as to expose the surface of the photosensitive member in the paper passing area by a first exposure amount and to form the electrostatic image on the surface of the photosensitive member, and so as to perform the exposing operation in the non-transfer area by a second exposure amount lower than the first exposure amount.

5. An image forming apparatus according to claim 1, wherein the control portion controls the exposure unit so as to perform the exposing operation while a non-image forming area of the surface of the photosensitive member in the rotational direction of the photosensitive member passes through the exposing portion where the surface of the photosensitive member is exposed.

6. An image forming apparatus according to claim 5, wherein the control portion controls the exposure unit so as to expose the surface of the photosensitive member in the paper passing area by a first exposure amount and to form the electrostatic image on the surface of the photosensitive member while the image forming area of the surface of the photosensitive member in the rotational direction of the photosensitive member passes through the exposing portion, and so as to perform the exposing operation by substantially the same exposure amount of the first exposure amount while the non-image forming area passes through the exposing portion.

7. An image forming apparatus according to claim 5, wherein during a continuous image formation for transferring the toner image onto a plurality of recording materials, the non-image forming area is a section between a position of the photosensitive member corresponding to a trailing end of a preceding recording material and a position of the photosensitive member corresponding to a leading end of a subsequent recording material.

8. An image forming apparatus according to claim 7, wherein a length of the section is set such that a sum of a length of the recording material with respect to a feeding direction of the recording material and the length of the section with respect to the rotational direction of the photosensitive member becomes other than approximately an integer number of times of a circumferential length of the photosensitive member.

9. An image forming apparatus comprising:

a rotatable photosensitive member;

a rotatable charging member configured to form a charging portion in contact with the photosensitive member and to charge a surface of the photosensitive member at the charging portion;

an exposure unit configured to expose the surface of the photosensitive member charged by the charging member and to form an electrostatic image on the surface of the photosensitive member;

a developing member configured to supply toner to the electrostatic image formed on the surface of the photosensitive member and to form a toner image;

a transfer member configured to form a transfer portion in contact with the surface of the photosensitive member and to transfer the toner image to a recording material from the surface of the photosensitive member at the transfer portion by application of a voltage; and a control portion configured to control the exposure unit, wherein in a rotational axis direction of the charging member, a width of the transfer portion is shorter than a width of the charging portion, and an end portion of the surface of the photosensitive member in the rotational axis direction includes a non-transfer area in contact with the charging member and not in contact with the transfer member, wherein in the rotational axis direction, an area in contact with the recording material at the transfer portion of the surface of the photosensitive member is defined as a paper passing area and an area outside of the paper passing area and inside of the transfer portion is defined as a transfer outside paper passing area, and wherein the control portion is capable of performing an exposing operation such that the exposure unit exposes at least the non-transfer area of the photosensitive member during rotation of the photosensitive member, and controls the exposure unit such that an exposure amount to the non-transfer area is higher than an exposure amount to the transfer outside paper passing area in the exposing operation.

10. An image forming apparatus according to claim 9, wherein the control portion controls the exposure unit so as to expose at least the non-transfer area of the photosensitive member and the transfer outside paper passing area in the exposing operation.

11. An image forming apparatus according to claim 9, wherein the control portion controls the exposure unit so as to perform the exposing operation while an image forming area of the surface of the photosensitive member in the rotational direction of the photosensitive member passes through the exposing portion where the surface of the photosensitive member is exposed.

12. An image forming apparatus according to claim 11, wherein while the image forming area passes through the exposing portion, the control portion controls the exposure unit so as to expose the surface of the photosensitive member in the paper passing area by a first exposure amount and to form the electrostatic image on the surface of the photosensitive member, and so as to perform the exposing operation in the non-transfer area by a second exposure amount lower than the first exposure amount.

13. An image forming apparatus according to claim 9, wherein the control portion controls the exposure unit so as to perform the exposing operation while a non-image forming area of the surface of the photosensitive member in the rotational direction of the photosensitive member passes through the exposing portion where the surface of the photosensitive member is exposed.

14. An image forming apparatus according to claim 13, wherein the control portion controls the exposure unit so as to expose the surface of the photosensitive member in the paper passing area by a first exposure amount and to form the electrostatic image on the surface of the photosensitive member while the image forming area of the surface of the photosensitive member in the rotational direction of the photosensitive member passes through the exposing portion, and so as to perform the exposing operation by substantially the same exposure amount of the first exposure amount while the non-image forming area passes through the exposing portion.

15. An image forming apparatus according to claim 13, wherein during a continuous image formation for transferring the toner image onto a plurality of recording materials, the non-image forming area is a section between a position of the photosensitive member corresponding to a trailing end of a preceding recording material and a position of the photosensitive member corresponding to a leading end of a subsequent recording material.

16. An image forming apparatus according to claim 15, wherein a length of the section is set such that a sum of a length of the recording material with respect to a feeding direction of the recording material and the length of the section with respect to the rotational direction of the photosensitive member becomes other than approximately an integer number of times of a circumferential length of the photosensitive member.

17. An image forming apparatus comprising:

a rotatable photosensitive member;

a rotatable charging member configured to form a charging portion in contact with the photosensitive member and to charge a surface of the photosensitive member at the charging portion;

an exposure unit configured to expose the surface of the photosensitive member charged by the charging member and to form an electrostatic image on the surface of the photosensitive member;

a developing member configured to supply toner to the electrostatic image formed on the surface of the photosensitive member and to form a toner image;

a transfer member configured to form a transfer portion in contact with the surface of the photosensitive member and to transfer the toner image to a recording material from the surface of the photosensitive member at the transfer portion by application of a voltage; and a control portion configured to control the exposure unit, wherein in a rotational axis direction of the charging member, a width of the transfer portion is shorter than a width of the charging portion, an end portion of the surface of the photosensitive member in the rotational axis direction includes a non-transfer area in contact with the charging member and not in contact with the transfer member, and at least a part of a toner coated area of the developing member overlaps with the non-transfer area in the rotational axis direction, wherein in the rotational axis direction, an area in contact with the recording material at the transfer portion of the surface of the photosensitive member is defined as a paper passing area and an area outside of the paper passing area and inside of the transfer portion is defined as a transfer outside paper passing area, and wherein the control portion controls to perform an exposing operation such that the exposure unit exposes at least the non-transfer area of the photosensitive member or at least the non-transfer area of the photosensitive member and the transfer outside paper passing area during rotation of the photosensitive member.

18. An image forming apparatus according to claim 17, wherein the control portion controls the exposure unit so as to expose at least the non-transfer area of the photosensitive member and the transfer outside paper passing area in the exposing operation.

19. An image forming apparatus according to claim 17, wherein the control portion controls the exposure unit so as to perform the exposing operation while an image forming area of the surface of the photosensitive member in the rotational direction of the photosensitive member passes through the exposing portion where the surface of the photosensitive member is exposed.

20. An image forming apparatus according to claim 19, wherein while the image forming area passes through the exposing portion, the control portion controls the exposure unit so as to expose the surface of the photosensitive member in the paper passing area by a first exposure amount and to form the electrostatic image on the surface of the photosensitive member, and so as to perform the exposing operation in the non-transfer area by a second exposure amount lower than the first exposure amount.

21. An image forming apparatus according to claim 17, wherein the control portion controls the exposure unit so as to perform the exposing operation while a non-image forming area of the surface of the photosensitive member in the rotational direction of the photosensitive member passes through the exposing portion where the surface of the photosensitive member is exposed.

22. An image forming apparatus according to claim 21, wherein the control portion controls the exposure unit so as to expose the surface of the photosensitive member in the paper passing area by a first exposure amount and to form the electrostatic image on the surface of the photosensitive member while the image forming area of the surface of the photosensitive member in the rotational direction of the photosensitive member passes through the exposing portion, and so as to perform the exposing operation by substantially the same exposure amount of the first exposure amount while the non-image forming area passes through the exposing portion.

23. An image forming apparatus according to claim 21, wherein during a continuous image formation for transferring the toner image onto a plurality of recording materials, the non-image forming area is a section between a position of the photosensitive member corresponding to a trailing end of a preceding recording material and a position of the photosensitive member corresponding to a leading end of a subsequent recording material.

24. An image forming apparatus according to claim 23, wherein a length of the section is set such that a sum of a length of the recording material with respect to a feeding direction of the recording material and the length of the section with respect to the rotational direction of the photosensitive member becomes other than approximately an integer number of times of a circumferential length of the photosensitive member.

* * * * *